United States Patent
Liu et al.

(10) Patent No.: US 12,110,437 B2
(45) Date of Patent: Oct. 8, 2024

(54) LIQUID CRYSTAL COMPOSITION AND LIQUID CRYSTAL DISPLAY DEVICE COMPRISING SAME

(71) Applicant: Jiangsu Hecheng Display Technology Co., Ltd., Nanjing (CN)

(72) Inventors: Yunyun Liu, Nanjing (CN); Di He, Nanjing (CN); Shuang Xu, Nanjing (CN); Haibin Xu, Nanjing (CN); Lifang Yao, Nanjing (CN); Yafei Yang, Nanjing (CN); Zhenting Zhou, Nanjing (CN); Dike Pan, Nanjing (CN); Fei Zhao, Nanjing (CN)

(73) Assignee: Jiangsu Hecheng Display Technology Co., Ltd., Nanjing (CN)

( * ) Notice: Subject to any disclaimer, the term of this patent is extended or adjusted under 35 U.S.C. 154(b) by 0 days.

(21) Appl. No.: 18/026,456

(22) PCT Filed: Aug. 12, 2021

(86) PCT No.: PCT/CN2021/112260
§ 371 (c)(1),
(2) Date: Mar. 15, 2023

(87) PCT Pub. No.: WO2022/057532
PCT Pub. Date: Mar. 24, 2022

(65) Prior Publication Data
US 2024/0026223 A1   Jan. 25, 2024

(30) Foreign Application Priority Data

Sep. 17, 2020   (CN) .......................... 202010981910.8

(51) Int. Cl.
*G02F 1/1333*    (2006.01)
*C09K 19/06*     (2006.01)
(Continued)

(52) U.S. Cl.
CPC ........ *C09K 19/3003* (2013.01); *C09K 19/062* (2013.01); *C09K 19/12* (2013.01);
(Continued)

(58) Field of Classification Search
CPC .. C09K 19/3003; C09K 19/062; C09K 19/12; C09K 19/18; C09K 19/2007; C09K 19/3028; C09K 19/3048; C09K 19/3098; C09K 19/20; C09K 19/30; C09K 19/3066; C09K 19/44; C09K 2019/122; C09K 2019/123; C09K 2019/181; C09K 2019/2035; C09K 2019/3004; C09K 2019/3009; C09K 2019/301; C09K 2019/3016; C09K 2019/3021; C09K 2019/3025; C09K 2019/303; C09K 2019/3036; C09K 2019/305; C09K 2019/3051; C09K 2019/3063; C09K 2019/3071; C09K 2019/3074; C09K 2019/3075; C09K 2019/3077; C09K 2019/3078; C09K 2019/3083; C09K 2019/3019; C09K 2019/0466; C09K 2019/3422; G02F 1/1333
See application file for complete search history.

(56) References Cited

U.S. PATENT DOCUMENTS

2019/0048263 A1    2/2019  Kurihara et al.
2024/0026223 A1*   1/2024  Liu .................... C09K 19/3003

FOREIGN PATENT DOCUMENTS

| CN | 104342165 A  | 2/2015  |
|----|--------------|---------|
| CN | 104513665 A  | 4/2015  |
| CN | 108350362 A  | 7/2018  |
| CN | 108699441 A  | 10/2018 |
| CN | 1089699441 A | 10/2018 |
| CN | 110554540 A  | 12/2019 |
| CN | 110643372 A  | 1/2020  |

(Continued)

*Primary Examiner* — Geraldina Visconti
(74) *Attorney, Agent, or Firm* — Hoffmann & Baron, LLP

(57) ABSTRACT

The present invention provides a liquid crystal composition and a liquid crystal display device thereof. The liquid crystal composition comprises at least one compound of general formula I and at least one compound of general formula II. The liquid crystal composition has a larger vertical dielectric constant ($\varepsilon_\perp$), a larger ratio of the vertical dielectric constant to the absolute value of dielectric anisotropy ($\varepsilon_\perp/|\Delta\varepsilon|$), a larger $K_{ave}$ value and a higher transmittance while maintaining an appropriate clearing point, an appropriate optical anisotropy, and an appropriate absolute value of the dielectric anisotropy, such that the liquid crystal display device comprising the same has a better contrast, a faster response speed and a better transmittance while maintaining an appropriate range of operating temperature and an appropriate threshold voltage.

12 Claims, No Drawings

(51) Int. Cl.
*C09K 19/12* (2006.01)
*C09K 19/18* (2006.01)
*C09K 19/20* (2006.01)
*C09K 19/30* (2006.01)

(52) U.S. Cl.
CPC .......... *C09K 19/18* (2013.01); *C09K 19/2007* (2013.01); *C09K 19/3028* (2013.01); *C09K 19/3048* (2013.01); *C09K 19/3098* (2013.01); C09K 2019/122 (2013.01); C09K 2019/123 (2013.01); C09K 2019/181 (2013.01); C09K 2019/2035 (2013.01); C09K 2019/3004 (2013.01); C09K 2019/3009 (2013.01); C09K 2019/301 (2013.01); C09K 2019/3016 (2013.01); C09K 2019/3021 (2013.01); C09K 2019/3025 (2013.01); C09K 2019/303 (2013.01); C09K 2019/3036 (2013.01); C09K 2019/305 (2013.01); C09K 2019/3051 (2013.01); C09K 2019/3063 (2013.01); C09K 2019/3071 (2013.01); C09K 2019/3074 (2013.01); C09K 2019/3075 (2013.01); C09K 2019/3077 (2013.01); C09K 2019/3078 (2013.01); C09K 2019/3083 (2013.01)

(56) References Cited

FOREIGN PATENT DOCUMENTS

| | | | |
|---|---|---|---|
| JP | 2018-158976 | A | 10/2018 |
| JP | 2019-211542 | A | 12/2019 |

\* cited by examiner

LIQUID CRYSTAL COMPOSITION AND LIQUID CRYSTAL DISPLAY DEVICE COMPRISING SAME

CROSS-REFERENCE TO RELATED APPLICATIONS

This application is the National Stage of International Application No. PCT/CN2021/112260, filed Aug. 12, 2021, which claims the benefit of Chinese Application No. 202010981910.8, filed Sep. 17, 2020, the contents of which is incorporated by reference herein.

TECHNICAL FIELD

The present invention relates to the field of liquid crystal, specifically to a liquid crystal composition and a liquid crystal display device comprising said liquid crystal composition.

BACKGROUND ARTS

Liquid crystal display elements can be used in all kinds of domestic electrical apparatuses, measuring apparatuses, automotive panels, word processors, computers, printers, televisions and so forth, such as clocks and calculators. According to the types of display mode, liquid crystal display elements can be classified into PC (phase change), TN (twisted nematic), STN (super twisted nematic), ECB (electrically controlled birefringence), OCB (optically compensated bend), IPS (in-plane switching), VA (vertical alignment) and so forth. According to the driving modes of elements, liquid crystal display elements can be classified into PM (passive matrix) type and AM (active matrix) type. PM is classified into the static type, multiplex type and so forth. AM is classified into TFT (thin film transistor) type, MIM (metal insulator metal) type and so forth. The types of TFT comprise amorphous silicon and polycrystal silicon. The latter is classified into a high-temperature type and a low-temperature type according to the manufacturing process. According to the types of light source, liquid crystal display elements can be classified into a reflection type utilizing a natural light, a transmission type utilizing a backlight, and a semi-transmission type utilizing both the natural light and the backlight.

A liquid crystal display device includes a liquid crystal composition having a nematic phase. The composition has appropriate characteristics. An AM device having good characteristics can be obtained via improving the characteristics of the composition. The correlations between the characteristics of composition and characteristics of AM device are summarized in Table 1 below.

TABLE 1

Characteristics of composition and AM device

| No. | Characteristics of composition | Characteristics of AM device |
| --- | --- | --- |
| 1 | Wide temperature range of a nematic phase | Wide workable temperature range |
| 2 | Small viscosity | Short response time |
| 3 | Appropriate optical anisotropy | Large contrast |
| 4 | Large absolute value of positive or negative dielectric anisotropy | Low threshold voltage, small electric power consumption, large contrast |
| 5 | Large specific resistance | Large voltage holding ratio, large contrast |

TABLE 1-continued

Characteristics of composition and AM device

| No. | Characteristics of composition | Characteristics of AM device |
| --- | --- | --- |
| 6 | Ultraviolet light and heat stabilities | Long service life |
| 7 | Large elastic constant | Large contrast, short response time |

In the application of liquid crystal display devices, the impact of contrast on the visual effect is very critical. Generally speaking, the larger the contrast is, the clearer and more eye-catching the image will be, and the more vibrant and gorgeous the colors will be. And if the contrast is small, the whole picture becomes gray and dull. High contrast is of great help for image clarity, detail performance, gray level performance. High contrast products have advantages in black and white contrast, clarity, integrity and so forth. Contrast also has a great impact on the display effect of dynamic video. The light-dark conversion in the dynamic image is fast, therefore, the higher the contrast is, the easier it is for the human eyes to distinguish such a conversion process.

According to the equation of the transmittance for IPS mode $T_r \propto |\Delta\varepsilon|/\varepsilon_\perp$ (wherein, $T_r$ represents transmittance, and "$\propto$" represents the "inverse proportion" relationship, $\Delta\varepsilon$ represents dielectric anisotropy, and s represents the dielectric constant perpendicular to the direction of the molecular axis), in order to improve the transmittance of the liquid crystal medium, $\Delta\varepsilon$ of liquid crystal medium can be decreased. But in general, the adjustment range for the drive voltage of the same product is limited. In addition, the liquid crystal molecules will tilt towards the Z axis under the action of the vertical component of the edge electric field, resulting in the change of its optical anisotropy. According to the equation $$T_r = \sin^2(2\chi)\sin^2\left(\frac{\pi \Delta n d}{\lambda}\right)$$

(wherein, $\chi$ is the angle between the optical axis of the liquid crystal layer and the optical axis of the polarizer, $\Delta n$ is the optical anisotropy, d is the distance between liquid crystal cells, and $\lambda$ is the wavelength), it can be seen that effective $\Delta n * d$ will affect $T_r$. In order to improve the transmittance of the liquid crystal, it is possible to increase $\Delta n * d$, but the retardation amount for each product is designed to be fixed.

In another aspect, based on the light leakage test of traditional IPS-LCD, the skilled artisan found that the main causes of the light leakage issues of LCD device are as follows: LC scattering, rubbing uniformity, CF/TFT scattering, and polarize ability, wherein LC scattering accounts for 63% of the factors affecting light leakage performance.

According to the following equation: LC Scattering $$\propto \frac{d \cdot \Delta n^2 \cdot (n_e + n_0)^2}{K_{ave}}$$

(wherein d represents the distance between liquid crystal cells, $\Delta n$ represents optical anisotropy, ne represents the refractive index of extraordinary light, $n_o$ represents the refractive index of ordinary light, $K_{ave}$ represents average elastic constant, $K_{ave}=1/3$ ($K_{11}+K_{22}+K_{33}$), $K_{11}$ is splay elastic constant, $K_{22}$ is twist elastic constant and $K_{33}$ is bend elastic constant). It can be seen from this equation that LC Scattering is inversely proportional to $K_{ave}$, and the light leakage of the liquid crystal material can be reduced by increasing $K_{ave}$.

In addition, the relationship between the contrast rate (CR) and the luminance (L) is as follows:

$$CR = L_{255}/L_0 \times 100\%,$$

wherein $L_{255}$ is the On-state luminance, and $L_0$ is the Off-state luminance. It can be seen that CR is significantly affected by the change of $L_0$. In the Off state, $L_0$ has nothing to do with the dielectric of the liquid crystal molecule, but is related to the LC Scattering of the liquid crystal material itself. The smaller the LC Scattering is, the smaller the $L_0$ will become, and the more significantly CR will be increased.

In view of the above, common methods used to improve the contrast and transmittance may be considered from the following two aspects: (1) keeping the dielectric anisotropy $\Delta\varepsilon$ of the liquid crystal composition unchanged, the transmittance may be effectively improved by increasing $\varepsilon_\perp$; (2) increasing the value of the average elastic constant $K_{ave}$ of liquid crystal composition, such that the liquid crystal molecules become more organized, have less light leakage, thereby improving the transmittance.

From the perspective of the preparation of liquid crystal materials, the performances of liquid crystal materials are interdependent, and the improvement of one performance index may make other performances change. Therefore, the preparation of liquid crystal materials with suitable performances in all aspects often requires creative labor.

SUMMARY OF THE INVENTION

Objects: An object of the present invention is to provide a liquid crystal composition, the liquid crystal composition has a larger vertical dielectric constant ($\varepsilon_\perp$) a larger ratio of the vertical dielectric constant to the absolute value of the dielectric anisotropy ($\varepsilon_\perp/|\Delta\varepsilon|$), a larger $K_{ave}$ value and a higher transmittance while maintaining an appropriate clearing point, an appropriate optical anisotropy, and an appropriate absolute value of the dielectric anisotropy.

Another object of the present invention is to provide a liquid crystal display device comprising the above liquid crystal composition.

Technical solutions: To realize the above invention objects, the present invention provides a liquid crystal composition comprising:

at least one compound of general formula I:

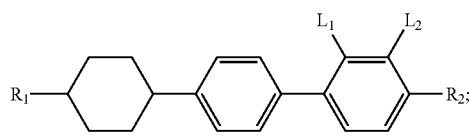
I at least one compound of general formula II:

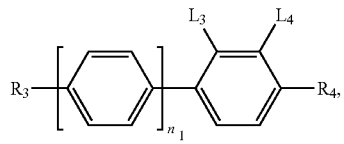
II wherein, $R_1$ represents $C_{2-12}$ linear or branched alkenyl or $C_{2-11}$ linear or branched alkenoxy;

$R_2$ represents $C_{1-12}$ linear or branched alkyl

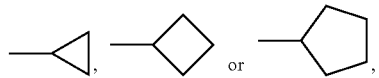

one or more than two nonadjacent —$CH_2$— in the $C_{1-12}$ linear or branched alkyl can each be independently replaced by —CH=CH—, —C≡C—, —O—, —CO—, —CO—O— or —O—CO—;

$R_3$ and $R_4$ each independently represents $C_{1-11}$ linear or branched alkoxy;

$L_1$, $L_2$, $L_3$ and $L_4$ each independently represents —F, —Cl, —$CF_3$, —$OCF_3$ or —$CHF_2$; and $n_1$ represents 0 or 1.

In some embodiments of the present invention, both $L_1$ and $L_2$ are —F.

In some embodiments of the present invention, preferably, $R_2$ represents $C_{1-10}$ linear or branched alkyl, $C_{1-9}$ linear or branched alkoxy or $C_{2-10}$ linear or branched alkenyl; further preferably, $R_2$ represents $C_{1-8}$ linear or branched alkyl, $C_{1-7}$ linear or branched alkoxy or $C_{2-8}$ linear or branched alkenyl.

In some embodiments of the present invention, the compound of general formula I is selected from a group consisting of the following compounds:

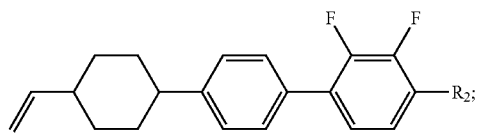
I-1

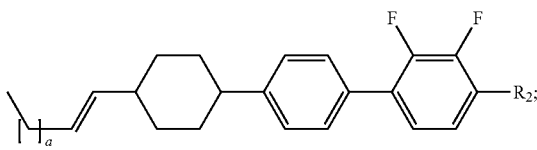
I-2

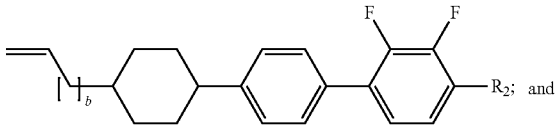
I-3
and

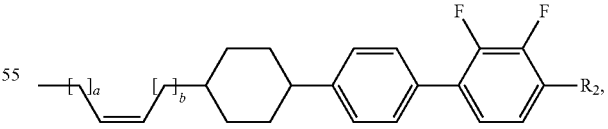
I-4 wherein, a represents an integer of 0-4; and b represents an integer of 1-4.

In some embodiments of the present invention, the compound of general formula I provides 0.1-50 wt. % of the total weight of the liquid crystal composition, for example, 0.1 wt. %, 0.5 wt. %, 1 wt. %, 2 wt. %, 4 wt. %, 6 wt. %, 8 wt. %, 10 wt. %, 11 wt. %, 12 wt. %, 13 wt. %, 14 wt. %, 15 wt. %, 16 wt. %, 17 wt. %, 18 wt. %, 20 wt. %, 22 wt. %, 24 wt. %, 25 wt. %, 26 wt. %, 28 wt. %, 30 wt. %, 32 wt. %, 34 wt. %, 35 wt. %, 36 wt. %, 38 wt. %, 40 wt. %, 42 wt. %, 44 wt. %, 46 wt. %, 48 wt. %, or 50 wt. %; preferably, the compound of general formula I provides 0.5-40 wt. % of the total weight of the liquid crystal composition.

In some embodiments of the present invention, the liquid crystal composition comprises at least two compounds of general formula I.

In some embodiments of the present invention, the liquid crystal composition comprises at least one of compound of general formula I-1 and/or general formula I-2.

In some embodiments of the present invention, when the absolute value of dielectric anisotropy is at the same or approximate level, in order to obtain a larger vertical dielectric constant ($\varepsilon_\perp$), a larger ratio of the vertical dielectric constant to the absolute value of dielectric anisotropy ($\varepsilon_\perp/|\Delta\varepsilon|$), a larger $K_{ave}$ value and a higher transmittance, the liquid crystal composition preferably comprises at least one compound of general formula I-2, and particularly preferably comprises at least one compound of general formula I-2 in which a=0.

In some embodiments of the present invention, both $L_3$ and $L_4$ are —F.

In some embodiments of the present invention, when the absolute value of dielectric anisotropy is at the same or approximate level, in order to obtain a larger vertical dielectric constant ($\varepsilon_\perp$), a larger ratio of the vertical dielectric constant to the absolute value of dielectric anisotropy ($\varepsilon_\perp/|\Delta\varepsilon|$), a larger $K_{ave}$ value and a higher transmittance, the liquid crystal composition preferably comprises at least two compounds of general formula II.

In some embodiments of the present invention, when the absolute value of dielectric anisotropy is at the same or approximate level, in order to obtain a larger vertical dielectric constant ($\varepsilon_\perp$), a larger ratio of the vertical dielectric constant to the absolute value of dielectric anisotropy ($\varepsilon_\perp/|\Delta\varepsilon|$), a larger $K_{ave}$ value and a higher transmittance, the liquid crystal composition preferably comprises at least one compound of general formula II in which $n_1$ represents 0.

In some embodiments of the present invention, when the absolute value of dielectric anisotropy is at the same or approximate level, in order to obtain a larger vertical dielectric constant ($\varepsilon_\perp$), a larger ratio of the vertical dielectric constant to the absolute value of dielectric anisotropy ($\varepsilon_\perp/|\Delta\varepsilon|$), a larger $K_{ave}$ value and a higher transmittance, the liquid crystal composition preferably comprises at least one compound of general formula I-2 in which a represents 0 and at least one compound of general formula II in which $n_1$ represents 0.

In some embodiments of the present invention, when the absolute value of dielectric anisotropy is at the same or approximate level, in order to obtain a larger vertical dielectric constant ($\varepsilon_\perp$), a larger ratio of the vertical dielectric constant to the absolute value of dielectric anisotropy ($\varepsilon_\perp/|\Delta\varepsilon|$), a larger $K_{ave}$ value and a higher transmittance, the liquid crystal composition preferably comprises at least one compound of general formula II in which $n_1$ represents 1.

In some embodiments of the present invention, when the absolute value of dielectric anisotropy is at the same or approximate level, in order to obtain a larger vertical dielectric constant ($\varepsilon_\perp$), a larger ratio of the vertical dielectric constant to the absolute value of dielectric anisotropy ($\varepsilon_\perp/|\Delta\varepsilon|$), a larger $K_{ave}$ value and a higher transmittance, the liquid crystal composition preferably comprises at least one compound of general formula I-2 in which a represents 0 and at least one compound of general formula II in which $n_1$ represents 1.

In some embodiments of the present invention, when the absolute value of dielectric anisotropy is at the same or approximate level, in order to obtain a larger vertical dielectric constant ($\varepsilon_\perp$), a larger ratio of the vertical dielectric constant to the absolute value of dielectric anisotropy ($\varepsilon_\perp/|\Delta\varepsilon|$), a larger $K_{ave}$ value and a higher transmittance, the liquid crystal composition preferably comprises at least one compound of general formula II in which $n_1$ represents 0 and at least one compound of general formula II in which $n_1$ represents 1.

In some embodiments of the present invention, the compound of general formula II provides 0.1-60 wt. % of the total weight of the liquid crystal composition, for example, 0.1 wt. %, 0.5 wt. %, 1 wt. %, 2 wt. %, 4 wt. %, 6 wt. %, 8 wt. %, 10 wt. %, 11 wt. %, 12 wt. %, 13 wt. %, 14 wt. %, 15 wt. %, 16 wt. %, 17 wt. %, 18 wt. %, 20 wt. %, 22 wt. %, 24 wt. %, 25 wt. %, 26 wt. %, 28 wt. %, 30 wt. %, 32 wt. %, 34 wt. %, 35 wt. %, 36 wt. %, 38 wt. %, 40 wt. %, 42 wt. %, 44 wt. %, 46 wt. %, 48 wt. %, 50 wt. %, 50 wt. %, 52 wt. %, 54 wt. %, 56 wt. %, 58 wt. %, or 60 wt. %; preferably, the compound of general formula II provides 0.5-40 wt. % of the total weight of the liquid crystal composition.

In some embodiments of the present invention, the liquid crystal composition of the present invention further comprises at least one compound of general formula M:

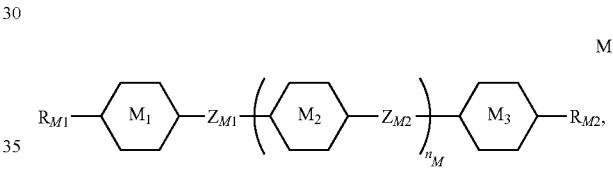

wherein, $R_{M1}$ and $R_{M2}$ each independently represents $C_{1-12}$ linear or branched alkyl,

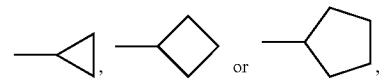

or one or more than two nonadjacent —$CH_2$— in the $C_{1-12}$ linear or branched alkyl can each be independently replaced by —CH=CH—, —C≡C—, —O—, —CO—, —CO—O— or —O—CO—; ring

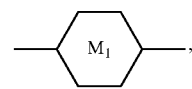

ring

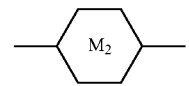

and ring

each independently represents

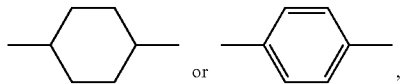

wherein one or more —CH$_2$— in

can be replaced by —O—, and one or more single bond in the ring can be replaced by double bond, and at most one —H on

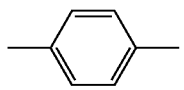

can be substituted by halogen,
$Z_{M1}$ and $Z_{M2}$ each independently represents single bond, —CO—O—, —O—CO—CH$_2$O—, —OCH$_2$—, —C≡C—, —CH=CH—, —CH$_2$CH$_2$— or —(CH$_2$)$_4$—; and
$n_M$ represents 0, 1 or 2, wherein, when $n_M$=2, ring

can be same or different, and $Z_{M2}$ can be same or different.

The alkenyl group in the present invention is preferably selected from the groups represented by any one of formula (V1) to formula (V9), particularly preferably formula (V1), formula (V2), formula (V8) or formula (V9). The groups represented by formula (V1) to formula (V9) are as follows:

 (V1)

 (V2)

 (V3)

 (V4)

 (V5)

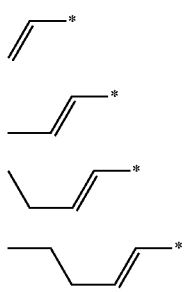

(V6)

(V7)

(V8)

(V9)

in which, * represents carbon atom that is bound in the ring structure.

The alkenoxy group in the present invention is preferably selected from the groups represented by any one of formula (OV1) to formula (OV9), particularly preferably formula (OV1), formula (OV2), formula (OV8) or formula (OV9). The groups represented by formula (OV1) to formula (OV9) are as follows:

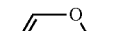 (OV1)

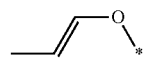 (OV2)

 (OV3)

 (OV4)

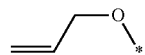 (OV5)

 (OV6)

 (OV7)

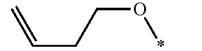 (OV8)

 (OV9)

in which, * represents carbon atom that is bound in the ring structure.

In some embodiments of the present invention, the compound of general formula M is selected from a group consisting of the following compounds:

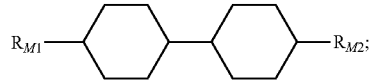

M-1

-continued

M-2: R_{M1}—[cyclohexane]—[benzene]—R_{M2};

M-3: R_{M1}—[cyclohexane]—[cyclohexene]—R_{M2};

M-4: R_{M1}—[cyclohexene]—[benzene]—R_{M2};

M-5: R_{M1}—[cyclohexane]—C(=O)O—[benzene]—R_{M2};

M-6: R_{M1}—[benzene]—[benzene]—R_{M2};

M-7: R_{M1}—[2-fluorobenzene]—[benzene]—R_{M2};

M-8: R_{M1}—[cyclohexane]—CH2CH2—[cyclohexane]—R_{M2};

M-9: R_{M1}—[cyclohexane]—CH=CH—[cyclohexane]—R_{M2};

M-10: R_{M1}—[benzene]—C≡C—[benzene]—R_{M2};

M-11: R_{M1}—[benzene]—C(=O)O—[benzene]—R_{M2};

M-12: R_{M1}—[cyclohexane]—[cyclohexane]—[benzene]—R_{M2};

M-13: R_{M1}—[cyclohexane]—[cyclohexene]—[benzene]—R_{M2};

M-14: R_{M1}—[cyclohexane]—[cyclohexane]—[benzene]—R_{M2};

M-15: R_{M1}—[cyclohexane]—CH=CH—[cyclohexane]—[benzene]—R_{M2};

M-16: R_{M1}—[cyclohexane]—[benzene]—[benzene]—R_{M2};

M-17: R_{M1}—[cyclohexene]—[benzene]—[benzene]—R_{M2};

M-18: R_{M1}—[benzene]—[benzene]—[benzene]—R_{M2};

M-19: R_{M1}—[benzene]—[2-fluorobenzene]—[benzene]—R_{M2};

M-20: R_{M1}—[benzene]—[2-fluorobenzene]—[benzene]—R_{M2};

M-21: R_{M1}—[cyclohexane]—[cyclohexane]—C(=O)O—[cyclohexane]—R_{M2};

M-22: R_{M1}—[cyclohexane]—[cyclohexane]—C(=O)O—[benzene]—R_{M2};

M-23: R_{M1}—[cyclohexane]—[benzene]—C(=O)O—[benzene]—R_{M2};

M-24: R_{M1}—[cyclohexane]—[cyclohexane]—CH2O—[cyclohexane]—R_{M2};

M-25: R_{M1}—[cyclohexane]—[benzene]—C≡C—[benzene]—R_{M2};

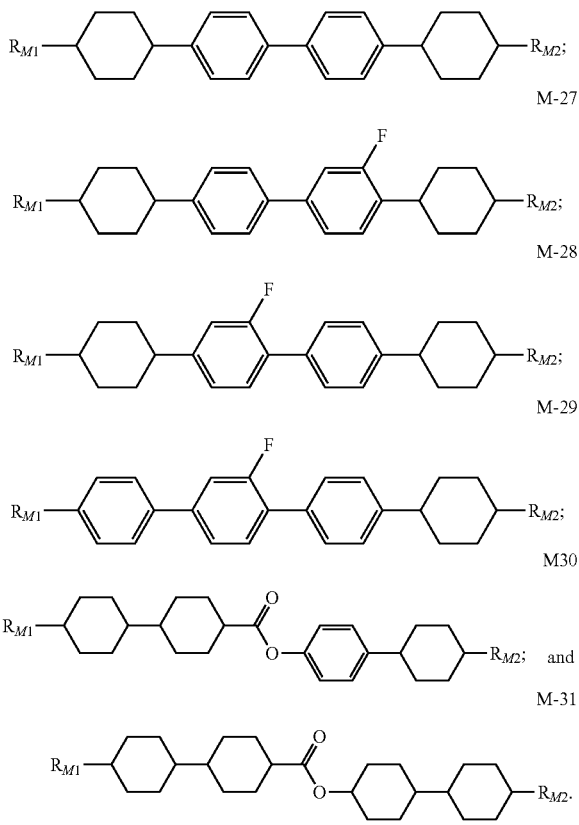

In some embodiments of the present invention, the compound of general formula M provides 1-80 wt. % of the total weight of the liquid crystal composition; for example, 1 wt. %, 2 wt. %, 4 wt. %, 6 wt. %, 8 wt. %, 10 wt. %, 11 wt. %, 12 wt. %, 13 wt. %, 14 wt. %, 15 wt. %, 16 wt. %, 17 wt. %, 18 wt. %, 20 wt. %, 22 wt. %, 24 wt. %, 25 wt. %, 26 wt. %, 28 wt. %, 30 wt. %, 32 wt. %, 34 wt. %, 35 wt. %, 36 wt. %, 38 wt. %, 40 wt. %, 42 wt. %, 44 wt. %, 46 wt. %, 48 wt. %, 50 wt. %, 52 wt. %, 54 wt. %, 56 wt. %, 58 wt. %, 60 wt. %, 62 wt. %, 64 wt. %, 66 wt. %, 68 wt. %, 70 wt. %, 72 wt. %, 74 wt. %, 76 wt. %, 78 wt. %, 80 wt. %; preferably, the compound of general formula M provides 20-70 wt. % of the total weight of the liquid crystal composition.

In some embodiments of the present invention, when the absolute value of dielectric anisotropy is at the same or approximate level, in order to obtain a larger vertical dielectric constant ($\varepsilon_\perp$), a larger ratio of the vertical dielectric constant to the absolute value of dielectric anisotropy ($\varepsilon_\perp / |\Delta\varepsilon|$), a larger $K_{ave}$ value and a higher transmittance, the liquid crystal composition preferably comprises at least one compound of general M-12 in which the end group on one side is alkenyl.

In some embodiments of the present invention, the content of the compound of general formula M must be appropriately adjusted depending on the required performance such as low temperature solubility, transition temperature, electrical reliability, birefringence index, process adaptability, drop trace, "burn-in", dielectric anisotropy and so on.

Regarding the content of the compound of general formula M, the lower limit value and the upper limit value of the content of the compound of general formula M are preferably higher when it is desired to maintain the liquid crystal composition of the present invention with a lower viscosity and a shorter response time; further, the lower limit value and the upper limit value of the content of the compound of general formula M are preferably higher when it is desired to maintain the liquid crystal composition of the present invention with a higher clearing point and a good temperature stability; the lower limit value and the upper limit value of the content of the compound of general formula M are preferably decreased in order to maintain the driving voltage lower and make the absolute value of dielectric anisotropy larger.

In some embodiments of the present invention, preferably, $R_{M1}$ and $R_{M2}$ each independently represents $C_{1-10}$ linear or branched alkyl, $C_{1-9}$ linear or branched alkoxy, or $C_{2-10}$ linear or branched alkenyl; further preferably, $R_{M1}$ and $R_{M2}$ each independently represents $C_{1-8}$ linear or branched alkyl, $C_{1-7}$ linear or branched alkoxy, or $C_{2-8}$ linear or branched alkenyl; and still further preferably, $R_{M1}$ and $R_{M2}$ each independently represents $C_{1-5}$ linear or branched alkyl, $C_{1-4}$ linear or branched alkoxy, or $C_{2-5}$ linear or branched alkenyl.

In some embodiments of the present invention, preferably, $R_{M1}$ and $R_{M2}$ each independently represents $C_{2-8}$ linear alkenyl; further preferably, $R_{M1}$ and $R_{M2}$ each independently represents $C_{2-5}$ linear alkenyl.

In some embodiments of the present invention, preferably, one of $R_{M1}$ and $R_{M2}$ is $C_{2-5}$ linear alkenyl and the other is $C_{1-5}$ linear alkyl.

In some embodiments of the present invention, preferably, $R_{M1}$ and $R_{M2}$ each independently represents $C_{1-8}$ linear alkyl or $C_{1-7}$ linear alkoxy; further preferably, $R_{M1}$ and $R_{M2}$ each independently represents $C_{1-5}$ linear alkyl or $C_{1-4}$ linear alkoxy.

In some embodiments of the present invention, preferably, one of $R_{M1}$ and $R_{M2}$ is $C_{1-5}$ linear alkyl and the other is $C_{1-5}$ linear alkyl or $C_{1-4}$ linear alkoxy; further preferably, each of $R_{M1}$ and $R_{M2}$ is independently $C_{1-5}$ linear alkyl In some embodiments of the present invention, with emphasis in reliability, both $R_{M1}$ and $R_{M2}$ are preferably alkyl; with emphasis in reducing the volatility of the compound, both $R_{M1}$ and $R_{M2}$ are preferably alkoxy; and with emphasis in reducing the viscosity, at least one of $R_{M1}$ and $R_{M2}$ is preferably alkenyl.

In some embodiments of the present invention, the liquid crystal composition of the present invention further comprises at least one compound of general formula III:

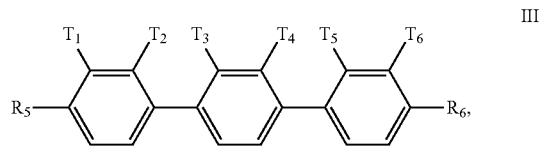

wherein,
$R_5$ and $R_6$ each independently represents $C_{1-12}$ linear or branched alkyl

one or more than two nonadjacent —$CH_2$— in the $C_{1-12}$ linear or branched alkyl can each be independently replaced by —CH=CH—, —C≡C—, —O—, —CO—, —CO—O— or —O—CO—;

$T_1$, $T_2$, $T_3$, $T_4$, $T_5$ and $T_6$ each independently represents —H, $C_{1-3}$ alkyl or halogen; and the compound of general formula III comprises at least one ring structure

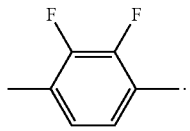

In some embodiments of the present invention, the compound of general formula III is selected from a group consisting of the following compounds:

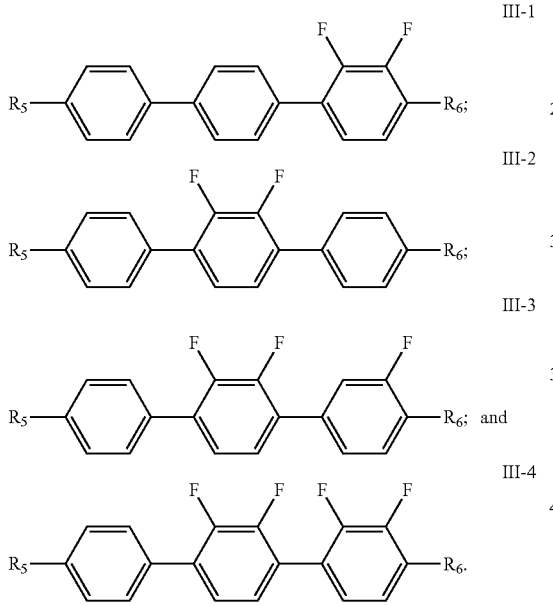

In some embodiments of the present invention, preferably, $R_5$ and $R_6$ each independently represents $C_{1-10}$ linear or branched alkyl, $C_{1-9}$ linear or branched alkoxy or $C_{2-10}$ linear or branched alkenyl; further preferably, $R_5$ and $R_6$ each independently represents $C_{1-8}$ linear or branched alkyl, $C_{1-7}$ linear or branched alkoxy, or $C_{2-8}$ linear or branched alkenyl; still further preferably, $R_5$ and $R_6$ each independently represents $C_{1-5}$ linear or branched alkyl, $C_{1-4}$ linear or branched alkoxy, or $C_{2-5}$ linear or branched alkenyl.

In some embodiments of the present invention, the compound of general formula III provides 0-30 wt. % of the total weight of the liquid crystal composition; for example, 0 wt. %, 0.1 wt. %, 1 wt. %, 2 wt. %, 4 wt. %, 6 wt. %, 8 wt. %, 10 wt. %, 11 wt. %, 12 wt. %, 13 wt. %, 14 wt. %, 15 wt. %, 16 wt. %, 17 wt. %, 18 wt. %, 20 wt. %, 22 wt. %, 24 wt. %, 25 wt. %, 26 wt. %, 28 wt. %, 30 wt. %; preferably, the compound of general formula III provides 0.1-25 wt. % of the total weight of the liquid crystal composition.

In some embodiments of the present invention, the liquid crystal composition of the present invention further comprises at least one compound of general formula N:

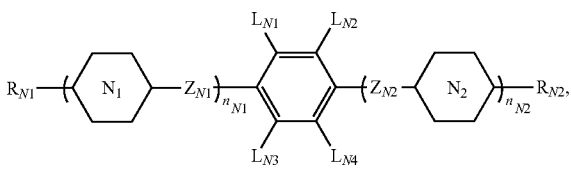

wherein, $R_{N1}$ and $R_{N2}$ each independently represents $C_{1-12}$ linear or branched alkyl,

or one or more than two nonadjacent —$CH_2$— in the $C_{1-12}$ linear or branched alkyl can each be independently replaced by —CH=CH—, —C≡C—, —O—, —CO—, —CO—O— or —O—CO—;

ring

and ring

each independently represents

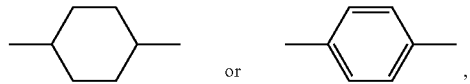

wherein one or more —$CH_2$— in

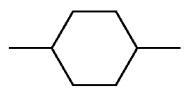

can be replaced by —O—, one or more single bond in the ring can be replaced by double bond, wherein one or more —H on

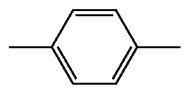

can each be independently substituted by —F, —Cl or —CN, and one or more —CH= within the ring can be replaced by —N=;

$Z_{N1}$ and $Z_{N2}$ each independently represents single bond, —CO—O—, —O—CO—, —CH$_2$O—, —OCH$_2$—, —CH=CH—, —C≡C—, —CH$_2$CH$_2$—, —CF$_2$CF$_2$—, —(CH$_2$)$_4$—, —CF$_2$O— or —OCF$_2$—;

$L_{N1}$ and $L_{N2}$ each independently represents —F, —Cl, —CF$_3$, —OCF$_3$ or —CHF$_2$;

$L_{N3}$ and $L_{N4}$ each independently represents —H, $C_{1-3}$ alkyl or halogen;

$n_{N1}$ represents 0, 1, 2 or 3, $n_{N2}$ represents 0 or 1, and $0 \leq n_{N1}+n_{N2} \leq 3$, wherein when $n_{N1}$=2 or 3, ring

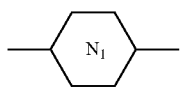

can be same or different and $Z_{N1}$ can be same or different;

when $n_{N1}+n_{N2}$=0, or $n_{N1}+n_{N2}$=1, and the compound of general formula N comprises biphenyl structure, $R_{N1}$ and $R_{N2}$ are not alkoxy;

when $n_{N1}$ represents 2, $n_{N2}$ represents 0, and the compound of general formula N comprises biphenyl structure, $R_{N1}$ is not alkenyl or alkenoxy; and when $n_{N1}+n_{N2}$=3, the compound of general formula N does not comprise terphenyl structure.

In some embodiments of the present invention, the compound of general formula N is selected from a group consisting of the following compounds:

N-1

N-2
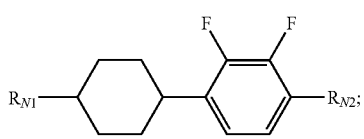

N-3
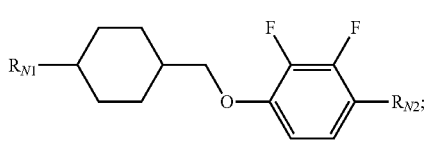

N-4
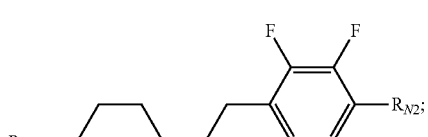

N-5

-continued

N-6
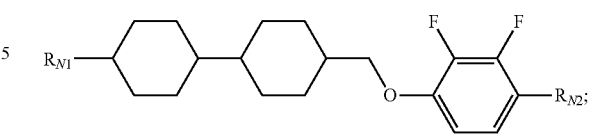

N-7
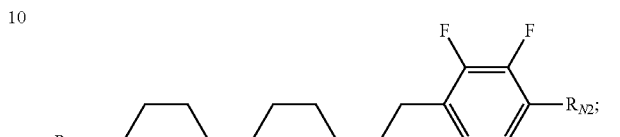

N-8
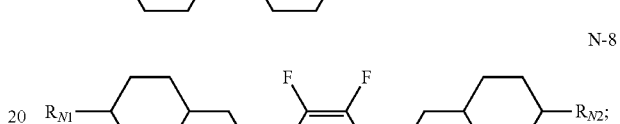

N-9
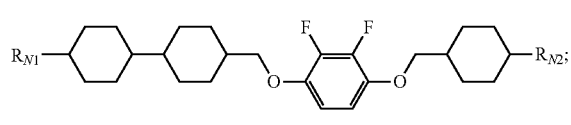

N-10
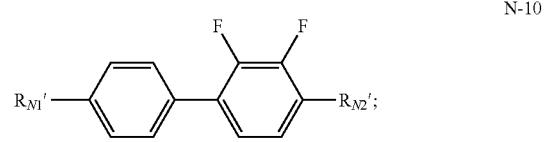

N-11
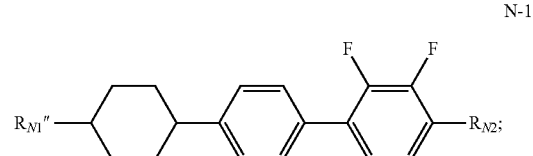

N-12
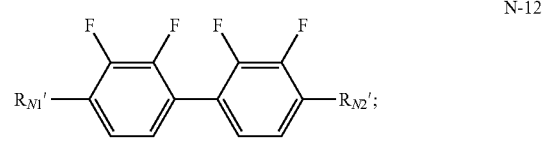

N-13
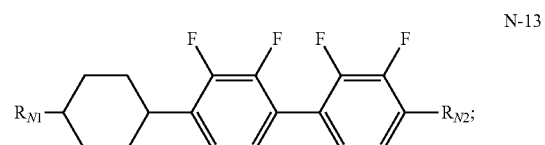

N-14
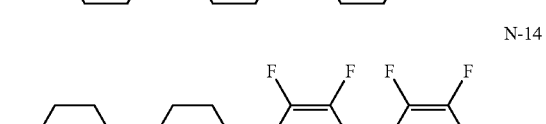

N-15
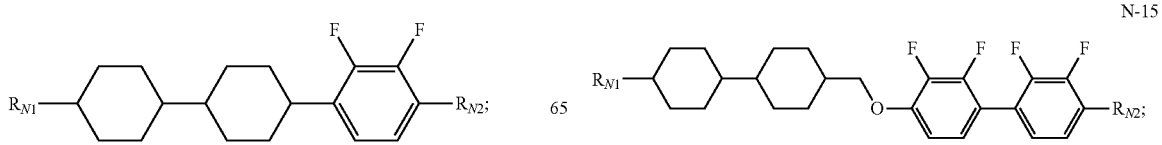

wherein, $R_{N1}'$ and $R_{N2}'$ each independently represents $C_{1-8}$ linear or branched alkyl, or $C_{2-8}$ linear or branched alkenyl; and $R_{N1}''$ represents $C_{1-8}$ linear or branched alkyl, or $C_{1-7}$ linear or branched alkoxy.

In some embodiments of the present invention, the compound of general formula N provides 0.1-60 wt. % of the total weight of the liquid crystal composition, for example, 0.1 wt. %, 1 wt. %, 2 wt. %, 4 wt. %, 6 wt. %, 8 wt. %, 10 wt. %, 11 wt. %, 12 wt. %, 13 wt. %, 14 wt. %, 15 wt. %, 16 wt. %, 17 wt. %, 18 wt. %, 20 wt. %, 22 wt. %, 24 wt. %, 25 wt. %, 26 wt. %, 28 wt. %, 30 wt. %, 32 wt. %, 34 wt. %, 35 wt. %, 36 wt. %, 38 wt. %, 40 wt. %, 42 wt. %, 44 wt. %, 46 wt. %, 48 wt. %, 50 wt. %, 52 wt. %, 54 wt. %, 56 wt. %, 58 wt. %, 60 wt. %; preferably, the compound of general formula N provides 1-55 wt. % of the total weight of the liquid crystal composition.

In some embodiments of the present invention, the lower limit value and the upper limit value of the content of the compound of general formula N are preferably lower when it is desired to maintain the liquid crystal composition of the present invention with a lower viscosity and a shorter response time. Further, the lower limit value and the upper limit value of the content of the compound of general formula N are preferably lower when it is desired to maintain the liquid crystal composition of the present invention with a higher clearing point and a good temperature stability. In addition, the lower limit value and the upper limit value of the content of the compound of general formula N are preferably increased in order to maintain the driving voltage lower and make the dielectric anisotropy larger.

In some embodiments of the present invention, preferably, $R_{N1}$ and $R_{N2}$ each independently represents $C_{1-10}$ linear or branched alkyl, $C_{1-9}$ linear or branched alkoxy, or $C_{2-10}$ linear or branched alkenyl; further preferably, $R_{N1}$ and $R_{N2}$ each independently represents $C_{1-8}$ linear or branched alkyl, $C_{1-7}$ linear or branched alkoxy, or $C_{2-8}$ linear or branched alkenyl, still further preferably, $R_{N1}$ and $R_{N2}$ each independently represents $C_{1-5}$ linear or branched alkyl, $C_{1-4}$ linear or branched alkoxy, or $C_{2-5}$ linear or branched alkenyl.

In some embodiments of the present invention, the liquid crystal composition of the present invention further comprises at least one compound of general formula A-1 and/or general formula A-2:

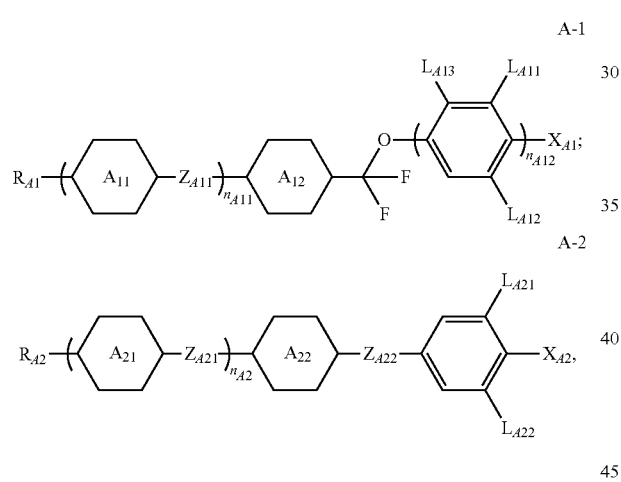

wherein, $R_{A1}$ and $R_{A2}$ each independently represents $C_{1-12}$ linear or branched alkyl,

one or more than two nonadjacent —CH$_2$— in the $C_{1-12}$ linear or branched alkyl can each be independently replaced by —CH=CH—, —C≡C—, —O—, —CO—, —CO—O— or —O—CO—, and one or more —H in the $C_{1-12}$ linear or branched alkyl,

can each be independently substituted by —F or —Cl;

ring

ring

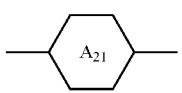

ring

and ring

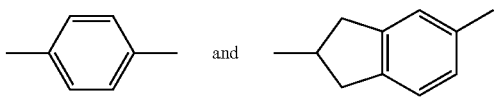

each independently represents

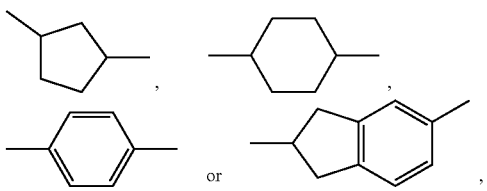

wherein one or more —CH$_2$— in

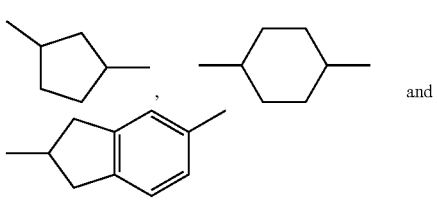

can be replaced by —O—, one or more single bond in the ring can be replaced by double bond, wherein one or more —H on

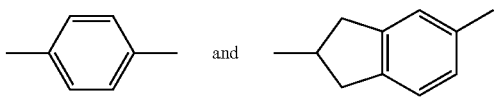

can each be independently substituted by —F, —Cl or —CN, one or more —CH= in the ring can be replaced by —N=;

$Z_{A11}$, $Z_{A21}$ and $Z_{A22}$ each independently represents single bond, —CH$_2$CH$_2$—, —CF$_2$CF$_2$—, —CO—O—, —O—CO—, —O—CO—O—, —CH=CH—, —CF=CF—, —CH$_2$O— or —OCH$_2$—;

$L_{A11}$, $L_{A12}$, $L_{A13}$, $L_{A21}$ and $L_{A22}$ each independently represents —H, $C_{1-3}$ alkyl or halogen;

$X_{A1}$ and $X_{A2}$ each independently represents halogen, $C_{1-5}$ halogenated alkyl or halogenated alkoxy, $C_{2-5}$ halogenated alkenyl or halogenated alkenoxy;

$n_{A11}$ represents 0, 1, 2 or 3, wherein, when $n_{A11}$=2 or 3, ring

can be same or different, and $Z_{A11}$ can be same or different;

$n_{A12}$ represents 1 or 2, wherein when $n_{A12}$=2, ring

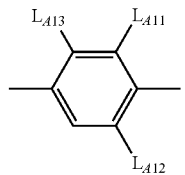

can be same or different; and $n_{A2}$ represents 0, 1, 2 or 3, wherein when $n_{A2}$=2 or 3, ring

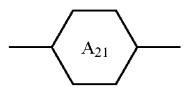

can be same or different, and $Z_{A21}$ can be same or different.

In some embodiments of the present invention, the compound of general formula A-1 is selected from a group consisting of the following compounds:

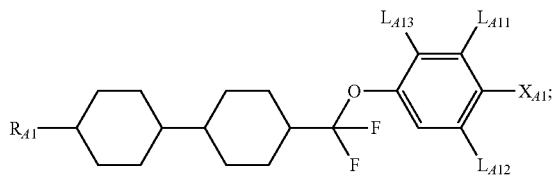

A-1-1

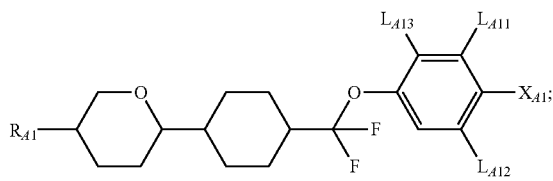

A-1-2

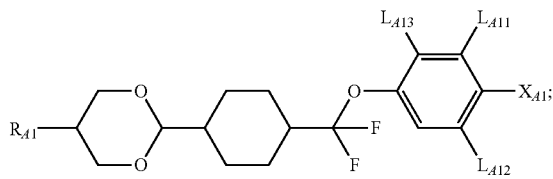

A-1-3

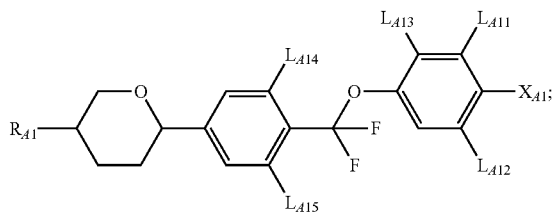

A-1-4

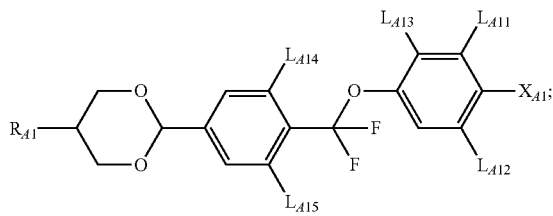

A-1-5

-continued
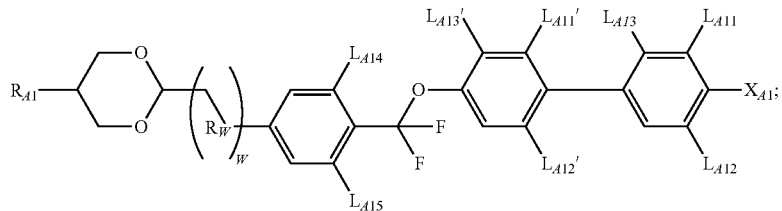 A-1-6
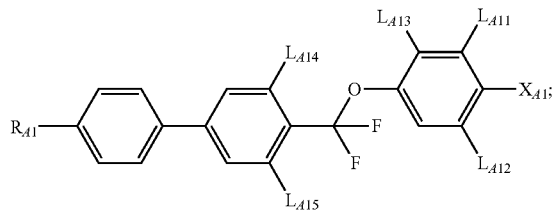 A-1-7
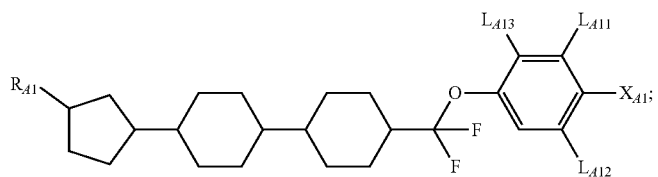 A-1-8
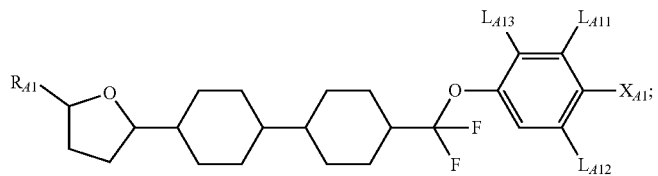 A-1-9
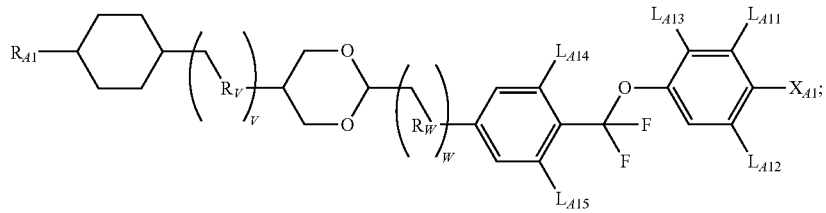 A-1-10
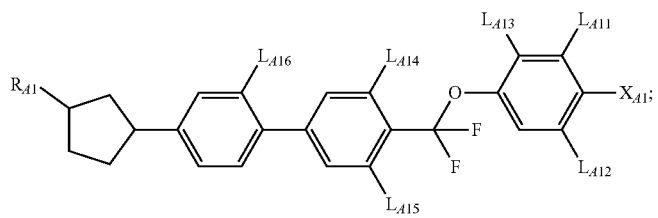 A-1-11
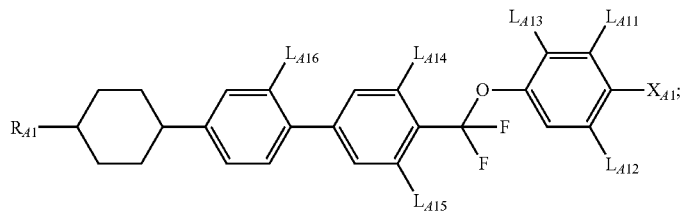 A-1-12

-continued

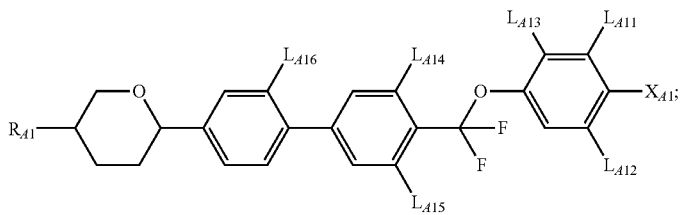
A-1-13

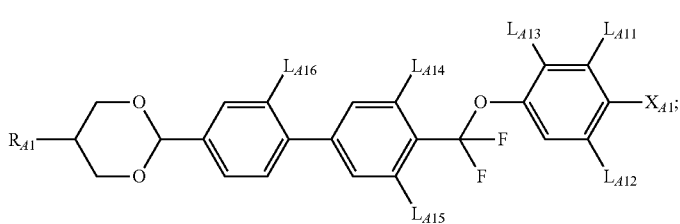
A-1-14

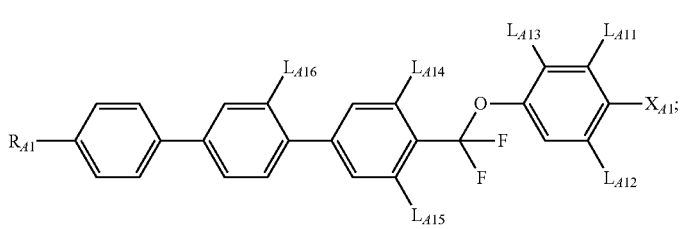
A-1-15

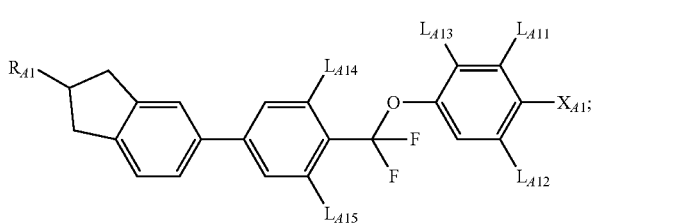
A-1-16

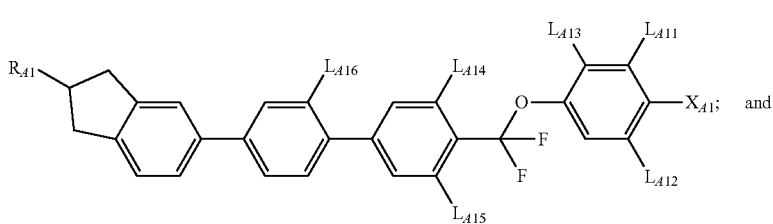
A-1-17 and

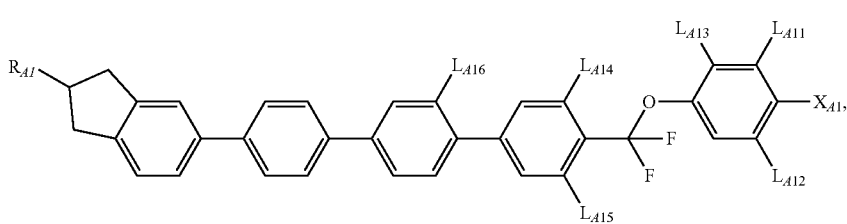
A-1-18 wherein, $R_{A1}$ represents $C_{1-8}$ linear or branched alkyl, one or more than two nonadjacent —$CH_2$— in the $C_{1-8}$ linear or branched alkyl can each be independently replaced by —CH=CH—, —C≡C—, —O—, —CO—, —COO— or —O—CO—, and one or more —H present in these groups can each be independently substituted by —F or —Cl;

$R_v$ and $R_w$ each independently represents —$CH_2$— or —O—;

$L_{A11}$, $L_{A12}$, $L_{A11}'$, $L_{A12}'$, $L_{A14}$, $L_{A15}$ and $L_{A16}$ each independently represents —H or —F;

$L_{A13}$ and $L_{A13}'$ each independently represents —H or —$CH_3$;

$X_{A1}$ represents —F, —$CF_3$ or —$OCF_3$; and v and w each independently represents 0 or 1.

In some embodiments of the present invention, the compound of general formula A-1 provides 0-50 wt. % of the total weight of the liquid crystal composition, for example, 0 wt. %, 0.1 wt. %, 1 wt. %, 2 wt. %, 4 wt. %, 6 wt. %, 8 wt. %, 10 wt. %, 11 wt. %, 12 wt. %, 13 wt. %, 14 wt. %, 15 wt. %, 16 wt. %, 17 wt. %, 18 wt. %, 20 wt. %, 22 wt. %, 24 wt. %, 25 wt. %, 26 wt. %, 28 wt. %, 30 wt. %, 32 wt. %, 34 wt. %, 35 wt. %, 36 wt. %, 38 wt. %, 40 wt. %, 42 wt. %, 44 wt. %, 46 wt. %, 48 wt. %, 50 wt. %.

Regarding the content of the compound of general formula A-1, it is preferred that the lower limit value and the upper limit value of the content of the compound of general formula A-1 are slightly lower when maintaining the liquid crystal composition of the present invention with a lower viscosity and a faster response speed; further, it is preferred that the lower limit value and the upper limit value of the content of the compound of general formula A-1 are slightly lower when maintaining the liquid crystal composition of the present invention with a higher clearing point and a good temperature stability; in addition, it is preferred that the lower limit value and the upper limit value of the content of the compound of general formula A-1 are slightly higher in order to maintain the driving voltage lower and increase the absolute value of dielectric anisotropy.

In some embodiments of the present invention, the compound of general formula A-2 is selected from a group consisting of the following compounds:

A-2-1
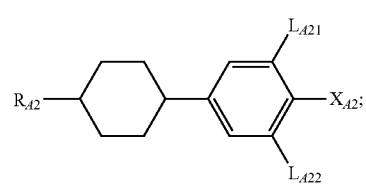

A-2-2
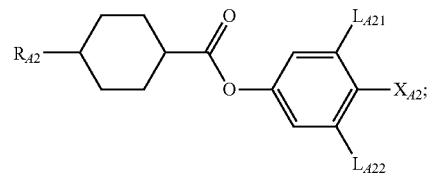

A-2-3
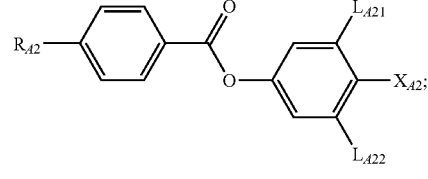

A-2-4
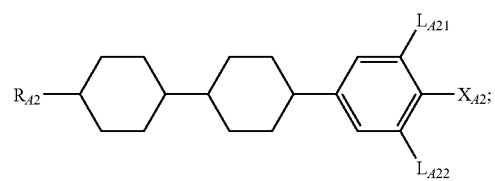

A-2-5
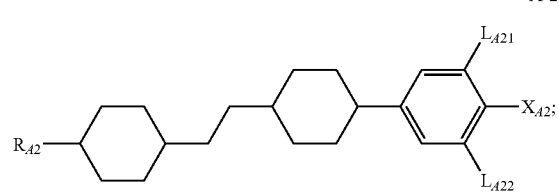

-continued

A-2-6
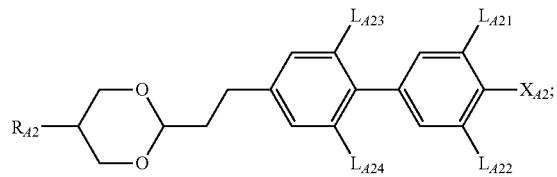

A-2-7
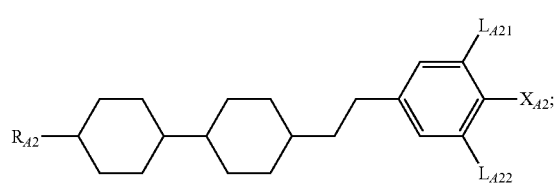

A-2-8
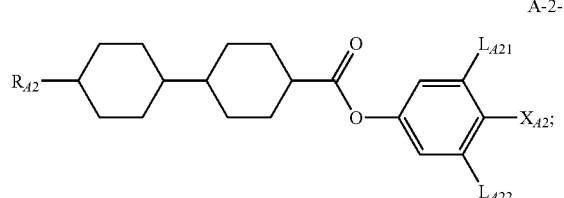

A-2-9
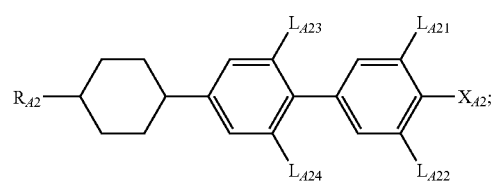

A-2-10
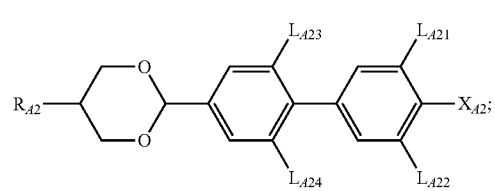

A-2-11
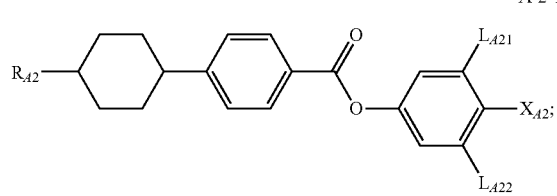

A-2-12
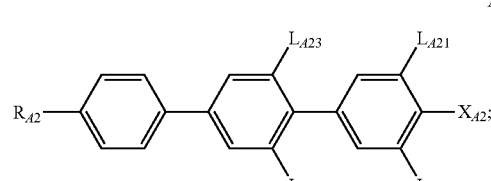

A-2-13
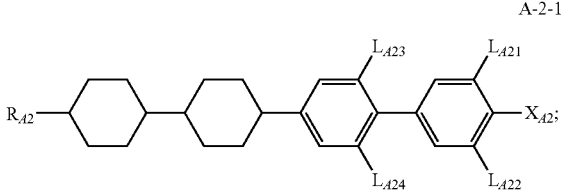

-continued

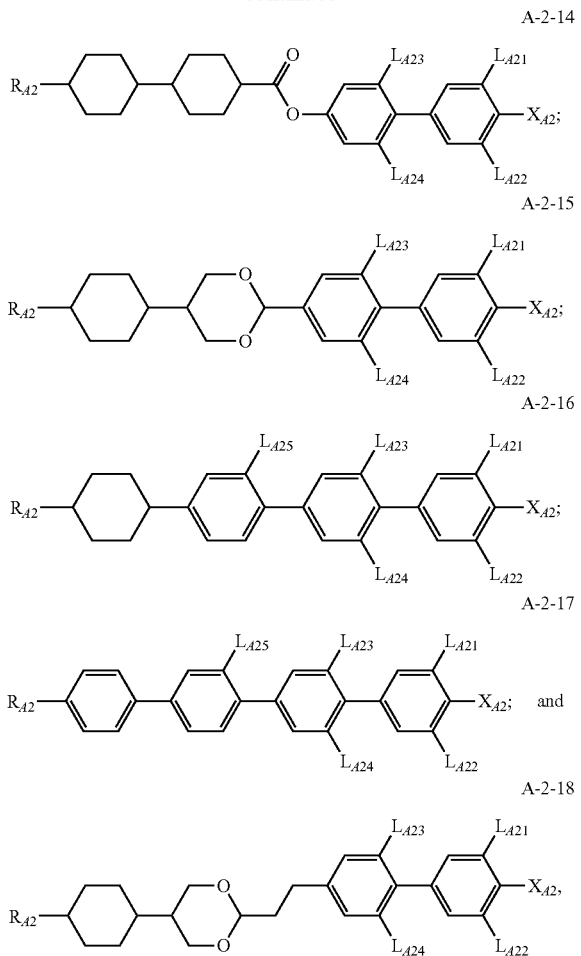

wherein, $R_{A2}$ represents $C_{1-8}$ linear or branched alkyl, one or more than two nonadjacent —$CH_2$— in the $C_{1-8}$ linear or branched alkyl can each be independently replaced by —CH=CH—, —C≡C—, —O—, —CO—, —CO—O— or —O—CO—, and one or more —H present in these groups can each be independently substituted by —F or —Cl;

$L_{A21}$, $L_{A22}$, $L_{A23}$, $L_{A24}$ and $L_{A25}$ each independently represents —H or —F; and $X_{A2}$ represents —F, —$CF_3$, —$OCF_3$ or —$CH_2CH_2CH$=$CF_2$.

In some embodiments of the present invention, the compound of general formula A-2 provides 0-50 wt. % of the total weight of the liquid crystal composition, for example, 0 wt. %, 0.1 wt. %, 1 wt. %, 2 wt. %, 4 wt. %, 6 wt. %, 8 wt. %, 10 wt. %, 11 wt. %, 12 wt %, 13 wt. %, 14 wt. %, 15 wt. %, 16 wt. %, 17 wt. %, 18 wt. %, 20 wt. %, 22 wt. %, 24 wt. %, 25 wt. %, 26 wt. %, 28 wt. %, 30 wt. %, 32 wt. %, 34 wt. %, 35 wt. %, 36 wt. %, 38 wt. %, 40 wt. %, 42 wt. %, 44 wt. %, 46 wt. %, 48 wt. %, 50 wt. %.

Regarding the content of the compound of general formula A-2, it is preferred that the lower limit value and the upper limit value of the content of the compound of general formula A-2 are slightly lower when maintaining the liquid crystal composition of the present invention with a lower viscosity and a faster response speed; further, it is preferred that the lower limit value and the upper limit value of the content of the compound of general formula A-2 are slightly lower when maintaining the liquid crystal composition of the present invention with a higher clearing point and a good temperature stability; in addition, it is preferred that the lower limit value and the upper limit value of the content of the compound of general formula A-2 are slightly higher in order to maintain the driving voltage lower and increase the absolute value of dielectric anisotropy.

In addition to the above compounds, the liquid crystal composition of the present invention may also contain normal nematic liquid crystal, smectic liquid crystal, cholesteric liquid crystal, dopants, antioxidant, ultraviolet absorber, infrared absorber, polymerizable monomer or light stabilizer and so forth.

Dopants which can be preferably added to the liquid crystal composition according to the present invention are shown below:

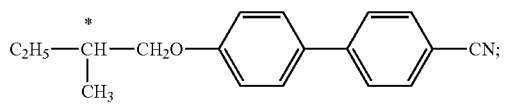
C 15

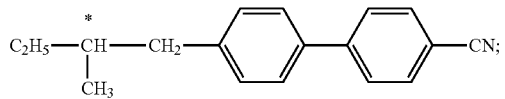
CB 15

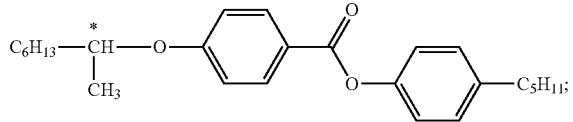
CM 21

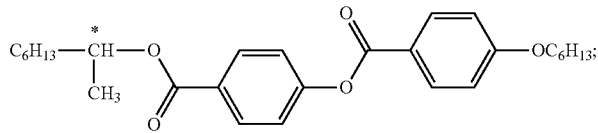
R/S-811

-continued
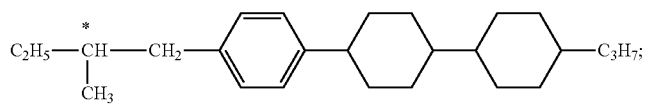 CM 44
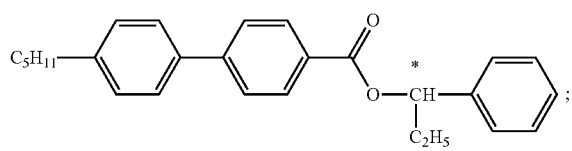 CM 45
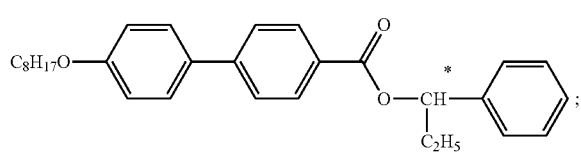 CM 47
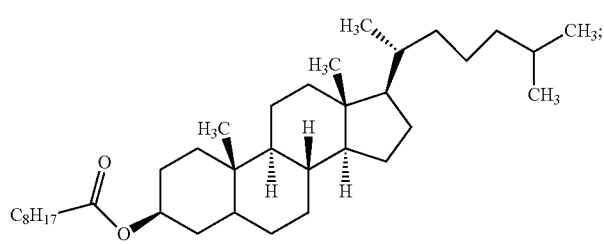 CN
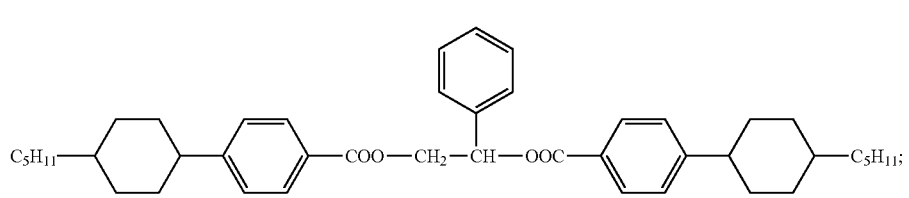 R/S-1011
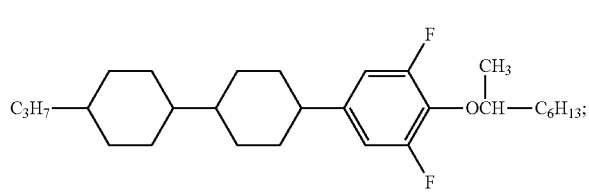 R/S-2011
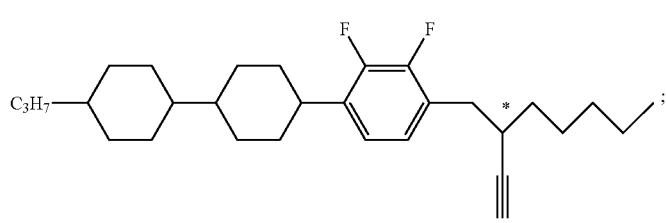 R/S-3011
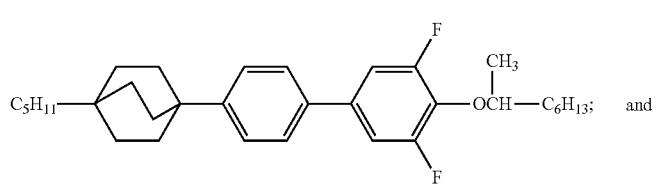 and R/S-4011

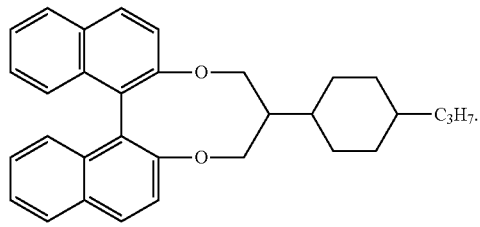

R/S-5011

In some embodiments of the present invention, the dopant provides 0-5 wt. % of the total weight of the liquid crystal composition; preferably, the dopant provides 0.01-1 wt. % of the total weight of the liquid crystal composition.

Further, additives used in the liquid crystal composition of the present invention, such as antioxidant and light stabilizer and the forth, are preferably selected from the

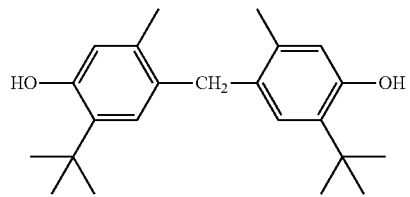
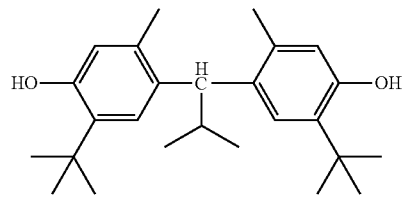
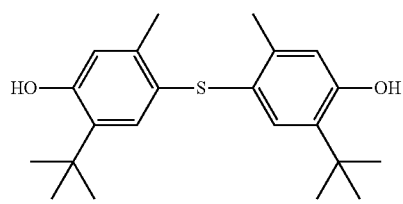
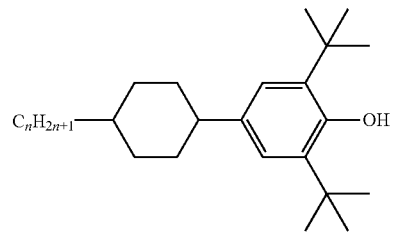
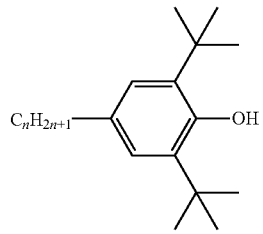
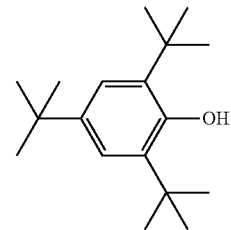
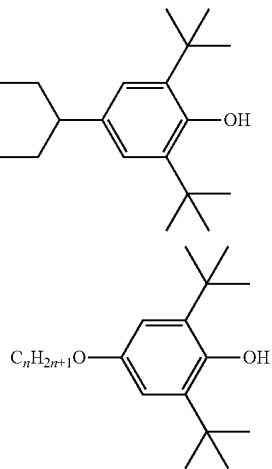
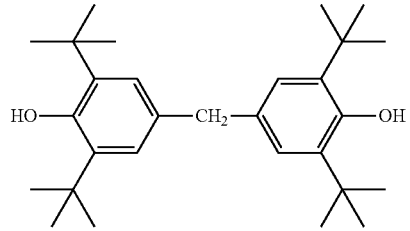
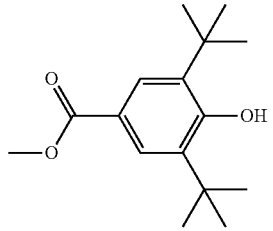
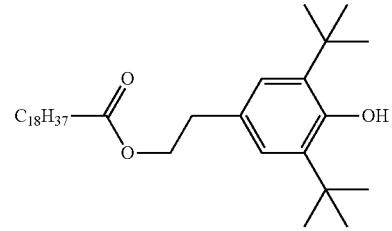
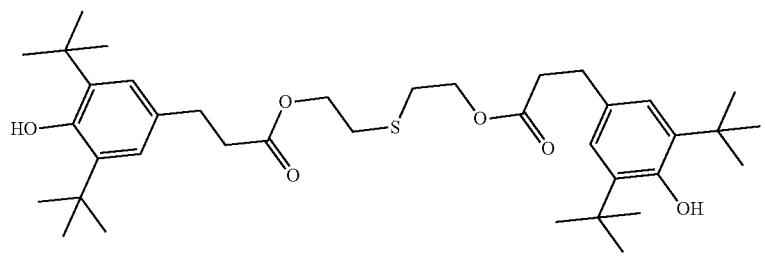
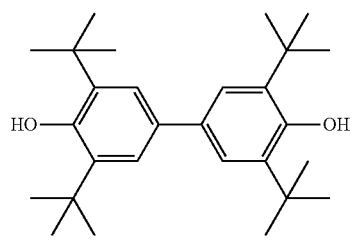

-continued
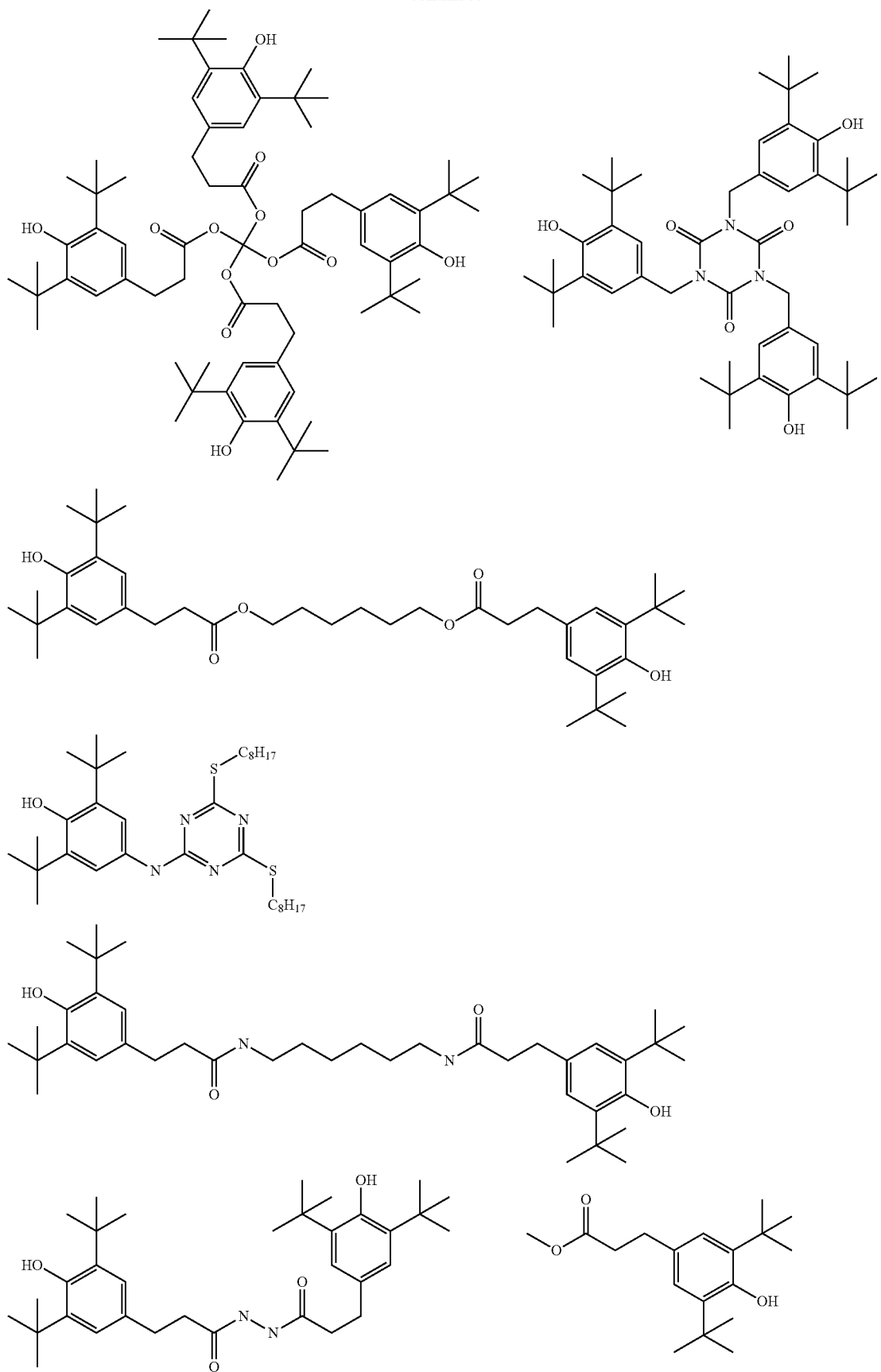

-continued
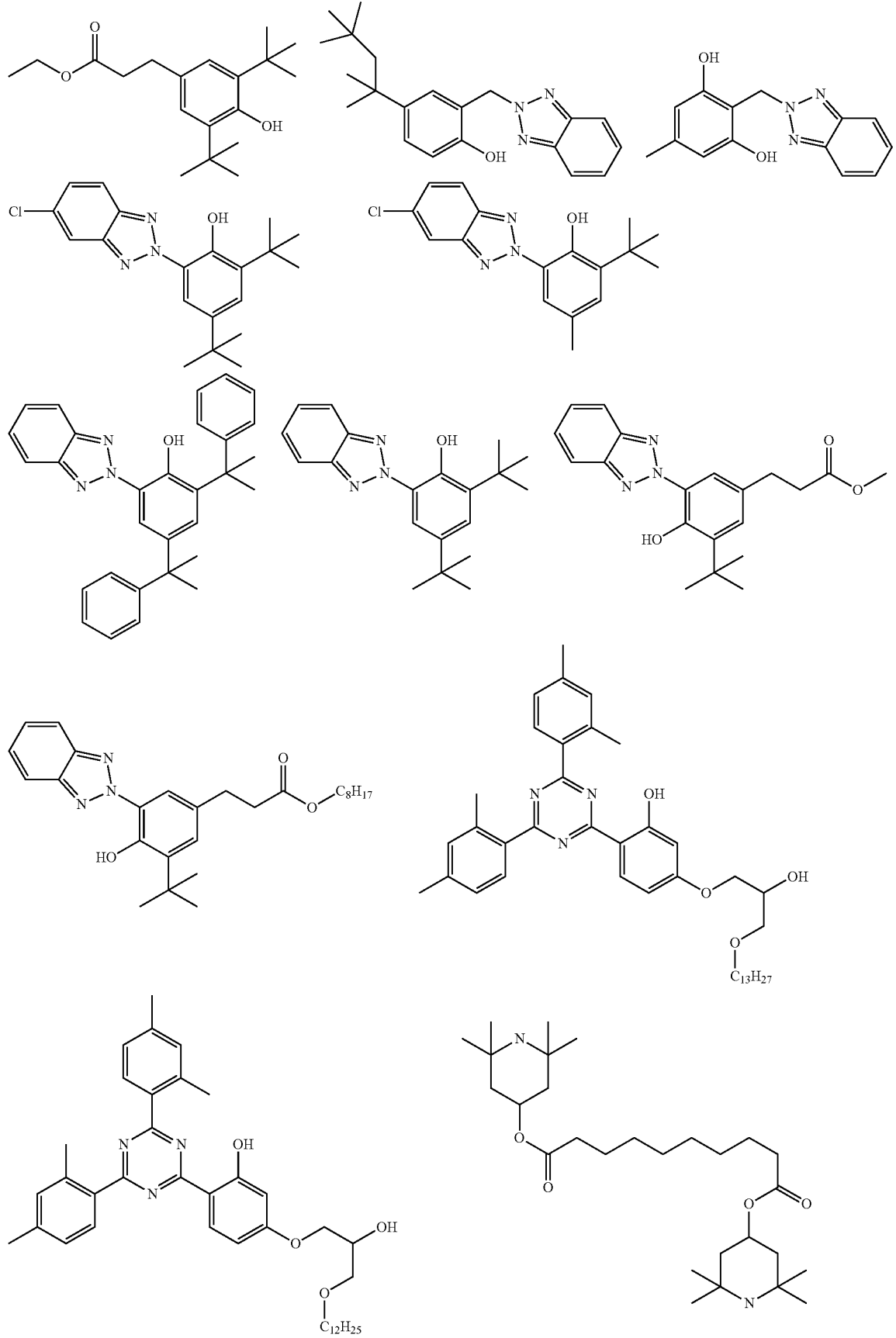

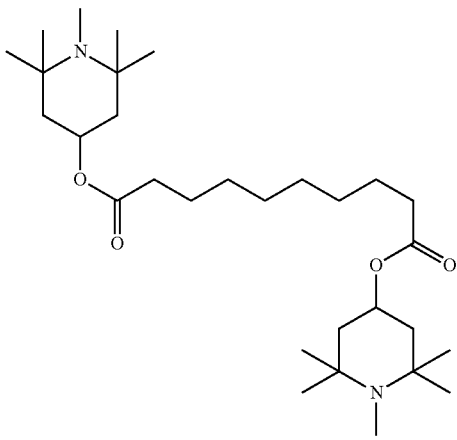

wherein, n represents a positive integer of 1-12.

Preferably, the light stabilizer is selected from the light stabilizers as shown below:

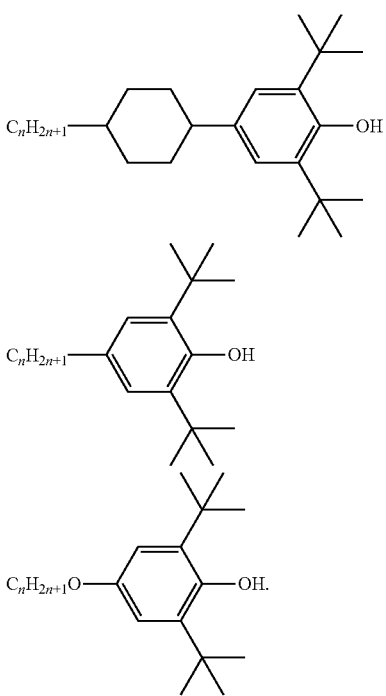

In some embodiments of the present invention, the light stabilizer provides 0-5 wt. % of the total weight of the liquid crystal composition; preferably, the light stabilizer provides 0.01-1 wt. % of the total weight of the liquid crystal composition; further preferably, the light stabilizer provides 0.01-0.1 wt. % of the total weight of the liquid crystal composition.

On a further aspect, the present invention further provides a liquid crystal display device comprising the above liquid crystal composition.

Beneficial Effects

As compared with the prior art, the liquid crystal composition of the present invention has a larger vertical dielectric constant ($\varepsilon_\perp$), a larger ratio of the vertical dielectric constant to the absolute value of dielectric anisotropy ($\varepsilon_\perp/|\Delta\varepsilon|$), a larger $K_{ave}$ value and a higher transmittance while maintaining an appropriate clearing point, an appropriate optical anisotropy, and an appropriate absolute value of the dielectric anisotropy, such that the liquid crystal display device comprising the liquid crystal composition has a better contrast, a faster response speed and a better transmittance while maintaining an appropriate range of operating temperature and an appropriate threshold voltage.

DETAILED EMBODIMENTS

The present invention will be illustrated by combining the detailed embodiments below. It should be noted that, the following examples are exemplary embodiments of the present invention, which are only used to illustrate the present invention, not to limit it. Other combinations and various modifications within the conception of the present invention are possible without departing from the subject matter and scope of the present invention.

For the convenience of the expression, the group structures of the compounds in the following Examples are represented by the codes listed in Table 2:

TABLE 2

| Codes of the group structures of the compounds | | |
|---|---|---|
| Unit structure of group | Code | Name of group |
| (cyclohexane ring) | C | 1,4-cyclohexylidene |
| (benzene ring) | P | 1,4-phenylene |
| (fluorobenzene ring) | G | 2-fluoro-1,4-phenylene |

TABLE 2-continued

Codes of the group structures of the compounds

| Unit structure of group | Code | Name of group |
|---|---|---|
| [F,F-phenylene structure] | W | 2,3-difluoro-1,4-phenylene |
| —F | F | fluorine substituent |
| —O— | O | oxygen bridge group |
| —$CH_2O$— | 1O | methyleneoxy |
| —CH=CH— or —CH=$CH_2$ | V | ethenyl |
| —$CH_2CH_2$— | 2 | ethyl bridge group |
| —$C_nH_{2n+1}$ or —$C_nH_{2n}$— | n (n represents an integer of 1-12) | alkyl or alkylene |

Take the compound with following structural formula as an example:

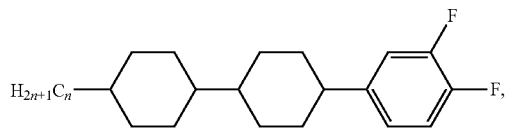

represented by the codes listed in Table 2, this structural formula can be expressed as nCCGF, in which, n in the code represents the number of the carbon atoms of the alkyl on the left, for example, n is "3", meaning that the alkyl is —$C_3H_7$; C in the code represents 1,4-cyclohexylidene, G represents 2-fluoro-1,4-phenylene, and F represents fluoro.

The abbreviated codes of the test items in the following Examples are as follows:

Cp clearing point (nematic-isotropy phases transition temperature, ° C.)
Δn optical anisotropy (589 nm, 25° C.)
$\varepsilon_\perp$ vertical dielectric constant
Δε dielectric anisotropy (1 KHz, 25° C.)
$\varepsilon_\perp/|\Delta\varepsilon|$ ratio of the vertical dielectric constant to the absolute value of dielectric anisotropy
$K_{ave}$ average elastic constant (20° C.)
$T_r$ transmittance (%) (20° C.)
wherein,
Cp: tested by melting point apparatus.
Δn: tested using an Abbe Refractometer under a sodium lamp (589 nm) light source at 25° C.
Δε: Δε=εi−$\varepsilon_\perp$; in which, εi is the dielectric constant parallel to the molecular axis, $\varepsilon_\perp$ is the dielectric constant perpendicular to the molecular axis, test conditions: 25° C., 1 KHz, VA-type test cell with a cell gap of 6 μm.
$T_r$: the V-T profile of the optic-tunable device is measured using a DMS 505 tester for optical-electro comprehensive performance test, and the maximum value of the transmittance in the V-T profile is taken as the transmittance of the liquid crystal, in which the test cell is a negative IPS mode cell with a cell gap of 3.5 μm.
$K_{ave}$: $K_{ave}=1/3$ ($K_{11}+K_{22}+K_{33}$), in which $K_{11}$, $K_{22}$ and $K_{33}$ are calculated through the C-V curves of the liquid crystal material tested by LCR meter and VA-type test cell; test conditions: 20° C., VA-type test cell with a cell gap of 6 μm, V=0.1~20 V.

The components used in the following Examples can either be synthesized by method known in the art or be obtained commercially. The synthetic techniques are conventional, and each of the obtained liquid crystal compounds is tested to meet the standards of electronic compound.

The liquid crystal compositions are prepared in accordance with the ratios specified in the following Examples. The preparation of the liquid crystal compositions is proceeded by mixing in accordance with the ratios through conventional methods in the art, such as heating, ultrasonic wave, suspension and the like.

Comparative Example 1

The liquid crystal composition of Comparative Example 1 is prepared according to each compound and weight percentage listed in Table 3 and is tested by filling the same between two substrates of a liquid crystal display device.

TABLE 3

Formulation and test performances of liquid crystal composition

| Code of component | Weight percent | Code of structure | Test results for the performance parameters | |
|---|---|---|---|---|
| 3CWO2 | 10 | N-2 | Cp | 80 |
| 3CWO4 | 8 | N-2 | Δn | 0.105 |
| 3CCWO2 | 10 | N-5 | $\varepsilon_\perp$ | 5.8 |
| 3CCWO3 | 9 | N-5 | Δε | −4.3 |
| 1VCPWO2 | 7 | I-2 | $K_{ave}$ | 12.7 |
| 3CPWO4 | 7 | N-11 | $T_r$ | 13.2 |
| 3CPO2 | 6 | M-2 | $\varepsilon_\perp/|\Delta\varepsilon|$ | 1.35 |
| 3CPP2 | 10 | M-16 | | |
| 3CC2 | 7 | M-1 | | |
| 3CCV | 20 | M-1 | | |
| 3CCV1 | 6 | M-1 | | |
| Total | 100 | | | |

Example 1

The liquid crystal composition of Example 1 is prepared according to each compound and weight percentage listed in Table 4 and is tested by filling the same between two substrates of a liquid crystal display device.

TABLE 4

Formulation and test performances of liquid crystal composition

| Code of component | Weight percent | Code of structure | Test results for the performance parameters | |
|---|---|---|---|---|
| 3CWO2 | 8 | N-2 | Cp | 81 |
| 3CCWO2 | 10 | N-5 | Δn | 0.108 |
| 3CCWO3 | 9 | N-5 | $\varepsilon_\perp$ | 7.3 |
| 1VCPWO2 | 7 | I-2 | Δε | −4.4 |
| 3CPWO4 | 7 | N-11 | $K_{ave}$ | 13.9 |
| 3CPO2 | 6 | M-2 | $T_r$ | 13.8 |
| 3CPP2 | 10 | M-16 | $\varepsilon_\perp/|\Delta\varepsilon|$ | 1.66 |
| 3CC2 | 7 | M-1 | | |
| 3CCV | 20 | M-1 | | |
| 3CCV1 | 6 | M-1 | | |
| 3OWO2 | 5 | II | | |
| 2OPWO2 | 5 | II | | |
| Total | 100 | | | |

It can be seen from the comparison between Comparative Example 1 and Example 1 that the liquid crystal composition comprising the compound of general formula I and the compound of general formula II of the present invention has a larger vertical dielectric constant ($\varepsilon_\perp$), a larger ratio of the vertical dielectric constant to the absolute value of dielectric anisotropy ($\varepsilon_\perp/|\Delta\varepsilon|$), a larger $K_{ave}$ value and a higher transmittance in view of the liquid crystal composition comprising only the compound of general formula I of the present invention, while maintaining an appropriate clearing point, an appropriate optical anisotropy, and an appropriate absolute value of the dielectric anisotropy.

Comparative Example 2

The liquid crystal composition of Comparative Example 2 is prepared according English Translation of PCT Application for 2690-37 PCTXUS to each compound and weight percentage listed in Table 5 and is tested by filling the same between two substrates of a liquid crystal display device.

TABLE 5

Formulation and test performances of liquid crystal composition

| Code of component | Weight percent | Code of structure | Test results for the performance parameters | |
|---|---|---|---|---|
| 3CWO2 | 10 | N-2 | Cp | 79 |
| 3CCWO2 | 7 | N-5 | $\Delta n$ | 0.106 |
| 3CCWO3 | 7 | N-5 | $\varepsilon_\perp$ | 6.2 |
| 3CPWO2 | 6 | N-11 | $\Delta\varepsilon$ | -4.2 |
| 3CPWO4 | 6 | N-11 | $K_{ave}$ | 12.4 |
| 3CPO2 | 6 | M-2 | $T_r$ | 12.9 |
| 3CPP2 | 5 | M-16 | $\varepsilon_\perp/|\Delta\varepsilon|$ | 1.48 |
| 3CC2 | 7 | M-1 | | |
| 3CCV | 20 | M-1 | | |
| 3CCV1 | 6 | M-1 | | |
| 5OWO3 | 7 | II | | |
| 2OPWO2 | 8 | II | | |
| 3PWP4 | 5 | III-2 | | |
| Total | 100 | | | |

Example 2

The liquid crystal composition of Example 2 is prepared according to each compound and weight percentage listed in Table 6 and is tested by filling the same between two substrates of a liquid crystal display device.

TABLE 6

Formulation and test performances of liquid crystal composition

| Code of component | Weight percent | Code of structure | Test results for the performance parameters | |
|---|---|---|---|---|
| 3CWO2 | 10 | N-2 | Cp | 76 |
| 3CCWO2 | 7 | N-5 | $\Delta n$ | 0.107 |
| 3CCWO3 | 7 | N-5 | $\varepsilon_\perp$ | 7.4 |
| 1VCPWO2 | 6 | I-2 | $\Delta\varepsilon$ | -4.5 |
| 3VCPWO4 | 6 | I-2 | $K_{ave}$ | 13.9 |
| 3CPO2 | 6 | M-2 | $T_r$ | 14.2 |
| 3CPP2 | 5 | M-16 | $\varepsilon_\perp/|\Delta\varepsilon|$ | 1.64 |
| 3CC2 | 7 | M-1 | | |
| 3CCV | 20 | M-1 | | |
| 3CCV1 | 6 | M-1 | | |
| 5OWO3 | 7 | II | | |
| 2OPWO2 | 8 | II | | |
| 3PWP4 | 5 | III-2 | | |
| Total | 100 | | | |

It can be seen from the comparison between Comparative Example 2 and Example 2 that the liquid crystal composition comprising the compound of general formula I and the compound of general formula of the present invention has a larger vertical dielectric constant ($\varepsilon_\perp$), a larger ratio of the vertical dielectric constant to the absolute value of dielectric anisotropy ($\varepsilon_\perp/|\Delta\varepsilon|$), a larger $K_{ave}$ value and a higher transmittance in view of the liquid crystal composition comprising only the compound of general formula II of the present invention, while maintaining an appropriate clearing point, an appropriate optical anisotropy, and an appropriate absolute value of the dielectric anisotropy.

Example 3

The liquid crystal composition of Example 3 is prepared according to each compound and weight percentage listed in Table 7 and is tested by filling the same between two substrates of a liquid crystal display device.

TABLE 7

Formulation and test performances of liquid crystal composition

| Code of component | Weight percent | Code of structure | Test results for the performance parameters | |
|---|---|---|---|---|
| 3CWO2 | 14 | N-2 | Cp | 78 |
| 3CCWO2 | 8 | N-5 | $\Delta n$ | 0.107 |
| VCPWO2 | 5 | I-1 | $\varepsilon_\perp$ | 7.3 |
| VCPWO4 | 5 | I-1 | $\Delta\varepsilon$ | -4.5 |
| 3CPO2 | 6 | M-2 | $K_{ave}$ | 13.8 |
| 3CPP2 | 8 | M-16 | $T_r$ | 13.9 |
| VCCP1 | 8 | M-12 | $\varepsilon_\perp/|\Delta\varepsilon|$ | 1.62 |
| 3CCV | 30 | M-1 | | |
| 3CCV1 | 6 | M-1 | | |
| 3OWO2 | 5 | II | | |
| 3PPWO2 | 5 | III-1 | | |
| Total | 100 | | | |

Example 4

The liquid crystal composition of Example 4 is prepared according to each compound and weight percentage listed in Table 8 and is tested by filling the same between two substrates of a liquid crystal display device.

TABLE 8

Formulation and test performances of liquid crystal composition

| Code of component | Weight percent | Code of structure | Test results for the performance parameters | |
|---|---|---|---|---|
| 3CWO2 | 14 | N-2 | Cp | 79 |
| 3CCWO2 | 8 | N-5 | $\Delta n$ | 0.109 |
| 1VCPWO2 | 5 | I-2 | $\varepsilon_\perp$ | 7.4 |
| 2VCPWO3 | 5 | I-2 | $\Delta\varepsilon$ | -4.5 |
| 3CPO2 | 6 | M-2 | $K_{ave}$ | 14.1 |
| 3CPP2 | 8 | M-16 | $T_r$ | 14.2 |
| VCCP1 | 8 | M-12 | $\varepsilon_\perp/|\Delta\varepsilon|$ | 1.64 |
| 3CCV | 30 | M-1 | | |
| 3CCV1 | 6 | M-1 | | |
| 3OWO2 | 5 | II | | |
| 3PPWO2 | 5 | III-1 | | |
| Total | 100 | | | |

Example 5

The liquid crystal composition of Example 5 is prepared according to each compound and weight percentage listed in Table 9 and is tested by filling the same between two substrates of a liquid crystal display device.

TABLE 9

Formulation and test performances of liquid crystal composition

| Code of component | Weight percent | Code of structure | Test results for the performance parameters | |
|---|---|---|---|---|
| 3CWO2 | 10 | N-2 | Cp | 79 |
| 3CCWO2 | 7 | N-5 | $\Delta n$ | 0.106 |
| 1VCPWO2 | 4 | I-2 | $\varepsilon_\perp$ | 7.4 |
| 3VCPWO2 | 4 | I-2 | $\Delta \varepsilon$ | −4.4 |
| 3CPO2 | 8 | M-2 | $K_{ave}$ | 13.7 |
| 5PP1 | 6 | M-6 | $T_r$ | 14.1 |
| VCCP1 | 6 | M-12 | $\varepsilon_\perp/|\Delta\varepsilon|$ | 1.68 |
| 3CC2 | 10 | M-1 | | |
| 3CCV | 25 | M-1 | | |
| 3CCV1 | 6 | M-1 | | |
| 3OPWO2 | 9 | II | | |
| 3PWP2 | 5 | III-2 | | |
| Total | 100 | | | |

Example 6

The liquid crystal composition of Example 6 is prepared according to each compound and weight percentage listed in Table 10 and is tested by filling the same between two substrates of a liquid crystal display device.

TABLE 10

Formulation and test performances of liquid crystal composition

| Code of component | Weight percent | Code of structure | Test results for the performance parameters | |
|---|---|---|---|---|
| 3CWO4 | 15 | N-2 | Cp | 78 |
| 3CCWO2 | 7 | N-5 | $\Delta n$ | 0.107 |
| 4VCPWO3 | 5 | I-2 | $\varepsilon_\perp$ | 7.5 |
| 3VCPWO2 | 5 | I-2 | $\Delta \varepsilon$ | −4.5 |
| V2CCP1 | 8 | M-12 | $K_{ave}$ | 13.8 |
| VCCP1 | 8 | M-12 | $T_r$ | 14 |
| 3CC2 | 18 | M-1 | $\varepsilon_\perp/|\Delta\varepsilon|$ | 1.67 |
| 5CC3 | 8 | M-1 | | |
| 5PP1 | 8 | M-6 | | |
| 3PPWO2 | 4 | III-1 | | |
| 3PPWO4 | 4 | III-1 | | |
| 3OPWO2 | 5 | II | | |
| 3OPWO4 | 5 | II | | |
| Total | 100 | | | |

Example 7

The liquid crystal composition of Example 7 is prepared according to each compound and weight percentage listed in Table 11 and is tested by filling the same between two substrates of a liquid crystal display device.

TABLE 11

Formulation and test performances of liquid crystal composition

| Code of component | Weight percent | Code of structure | Test results for the performance parameters | |
|---|---|---|---|---|
| 3OWO4 | 12 | II | Cp | 82 |
| 3CCWO2 | 6 | N-5 | $\Delta n$ | 0.108 |
| 3CCWO3 | 6 | N-5 | $\varepsilon_\perp$ | 7.3 |
| 1VCPWO2 | 8 | I-2 | $\Delta \varepsilon$ | −4.6 |
| V2CCP1 | 6 | M-12 | $K_{ave}$ | 14.1 |
| VCCP1 | 6 | M-12 | $T_r$ | 13.8 |
| 3CCV | 25 | M-1 | $\varepsilon_\perp/|\Delta\varepsilon|$ | 1.59 |
| 3CCV1 | 8 | M-1 | | |
| 5PP1 | 5 | M-6 | | |
| 3PWP2 | 4 | III-2 | | |
| 3PWP4 | 4 | III-2 | | |
| 3OPWO2 | 5 | II | | |
| 3OPWO4 | 5 | II | | |
| Total | 100 | | | |

Example 8

The liquid crystal composition of Example 8 is prepared according to each compound and weight percentage listed in Table 12 and is tested by filling the same between two substrates of a liquid crystal display device.

TABLE 12

Formulation and test performances of liquid crystal composition

| Code of component | Weight percent | Code of structure | Test results for the performance parameters | |
|---|---|---|---|---|
| 3OWO4 | 6 | II | Cp | 78 |
| 3CWO2 | 12 | N-2 | $\Delta n$ | 0.107 |
| 3CCWO3 | 6 | N-5 | $\varepsilon_\perp$ | 7.1 |
| 1VCPWO3 | 6 | I-2 | $\Delta \varepsilon$ | −4.5 |
| V2CCP1 | 5 | M-12 | $K_{ave}$ | 13.8 |
| VCCP1 | 5 | M-12 | $T_r$ | 13.9 |
| 3CCV | 28 | M-1 | $\varepsilon_\perp/|\Delta\varepsilon|$ | 1.58 |
| 3CCV1 | 6 | M-1 | | |
| 3CPP2 | 8 | M-16 | | |
| 3PPWO2 | 4 | III-1 | | |
| 3PPWP4 | 4 | N-17 | | |
| 3OPWO2 | 5 | II | | |
| 3OPWO4 | 5 | II | | |
| Total | 100 | | | |

Example 9

The liquid crystal composition of Example 9 is prepared according to each compound and weight percentage listed in Table 13 and is tested by filling the same between two substrates of a liquid crystal display device.

TABLE 13

Formulation and test performances of liquid crystal composition

| Code of component | Weight percent | Code of structure | Test results for the performance parameters | |
|---|---|---|---|---|
| 3CWO4 | 8 | N-2 | Cp | 79 |
| 3CWO2 | 10 | N-2 | $\Delta n$ | 0.105 |
| 3CCWO3 | 6 | N-5 | $\varepsilon_\perp$ | 7.3 |
| 1VCPWO3 | 4 | I-2 | $\Delta \varepsilon$ | −4.6 |
| 1VCPWO5 | 4 | I-2 | $K_{ave}$ | 14 |
| V2CCP1 | 5 | M-12 | $T_r$ | 13.8 |
| 1PP2V | 5 | M-6 | $\varepsilon_\perp/|\Delta\varepsilon|$ | 1.59 |
| 3CCV | 28 | M-1 | | |
| 3CCV1 | 6 | M-1 | | |
| 3CPP2V | 6 | M-16 | | |

TABLE 13-continued

Formulation and test performances of liquid crystal composition

| Code of component | Weight percent | Code of structure | Test results for the performance parameters |
|---|---|---|---|
| 3PWP2 | 4 | III-2 | |
| 3PWP4 | 4 | III-2 | |
| 3OPWO2 | 5 | II | |
| 3OPWO4 | 5 | II | |
| Total | 100 | | |

Example 10

The liquid crystal composition of Example 10 is prepared according to each compound and weight percentage listed in Table 14 and is tested by filling the same between two substrates of a liquid crystal display device.

TABLE 14

Formulation and test performances of liquid crystal composition

| Code of component | Weight percent | Code of structure | Test results for the performance parameters | |
|---|---|---|---|---|
| 3C1OWO2 | 14 | N-3 | Cp | 80 |
| 3CC1OWO2 | 8 | N-6 | $\Delta n$ | 0.106 |
| 2VCPWO3 | 5 | I-2 | $\varepsilon_\perp$ | 7.4 |
| 3VCPWO2 | 5 | I-2 | $\Delta\varepsilon$ | -4.7 |
| V2CCP1 | 6 | M-12 | $K_{ave}$ | 14.2 |
| VCCP1 | 8 | M-12 | $T_r$ | 14 |
| 3CCV | 22 | M-1 | $\varepsilon_\perp/|\Delta\varepsilon|$ | 1.58 |
| 3CCV1 | 8 | M-1 | | |
| 5PP1 | 8 | M-6 | | |
| 3PPWO2 | 3 | III-1 | | |
| 3PPWO4 | 3 | III-1 | | |
| 3OPWO2 | 5 | II | | |
| 3OPWO4 | 5 | II | | |
| Total | 100 | | | |

Example 11

The liquid crystal composition of Example 11 is prepared according to each compound and weight percentage listed in Table 15 and is tested by filling the same between two substrates of a liquid crystal display device.

TABLE 15

Formulation and test of liquid crystal composition

| Code of component | Weight percent | Code of structure | Test results for the performance parameters | |
|---|---|---|---|---|
| 3C1OWO2 | 16 | N-3 | Cp | 81 |
| 3CC1OWO2 | 5 | N-6 | $\Delta n$ | 107 |
| 4CC1OWO2 | 5 | N-6 | $\varepsilon_\perp$ | 7.5 |
| 1VCPWO3 | 4 | I-2 | $\Delta\varepsilon$ | -4.8 |
| 1VCPWO5 | 4 | I-2 | $K_{ave}$ | 14.1 |
| V2CCP1 | 6 | M-12 | $T_r$ | 14.3 |
| 1PP2V | 8 | M-6 | $\varepsilon_\perp/|\Delta\varepsilon|$ | 1.56 |
| 3CC2 | 18 | M-1 | | |
| 5CC3 | 8 | M-1 | | |
| 5PP1 | 8 | M-6 | | |

TABLE 15-continued

Formulation and test of liquid crystal composition

| Code of component | Weight percent | Code of structure | Test results for the performance parameters |
|---|---|---|---|
| 3PWP2 | 4 | III-2 | |
| 3PWP4 | 4 | III-2 | |
| 3OPWO2 | 5 | II | |
| 3OPWO4 | 5 | II | |
| Total | 100 | | |

In conclusion, the liquid crystal composition of the present invention has a larger vertical dielectric constant ($\varepsilon_\perp$), a larger ratio of the vertical dielectric constant to the absolute value of dielectric anisotropy ($\varepsilon_\perp/|\Delta\varepsilon|$), a larger $K_{ave}$ value and a higher transmittance while maintaining an appropriate clearing point, an appropriate optical anisotropy, and an appropriate absolute value of the dielectric anisotropy. In particular when the liquid crystal composition contains the compound of general formula I-2, the performance is significantly improved such that the liquid crystal display device comprising the liquid crystal composition of the present invention has a better contrast, a faster response speed and a better transmittance while maintaining an appropriate range of operating temperature and an appropriate threshold voltage.

The above embodiments are merely illustrative of the technical concepts and features of the present invention, and provided for facilitating the understanding and practice of the present invention by those skilled in the art. However, the protection scope of the invention is not limited thereto. Equivalent variations or modifications made without departing from the spirit and essence of the present invention are intended to be contemplated within the protection scope of the present invention.

INDUSTRIAL APPLICABILITY

The liquid crystal composition involved in the present invention can be applied to the field of liquid crystal.

The invention claimed is:
1. A liquid crystal composition comprising:
at least one compound of general formula I:

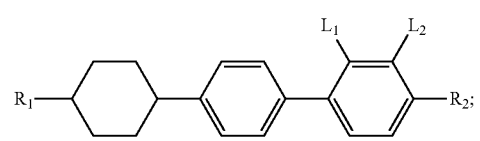

at least one compound of general formula II:

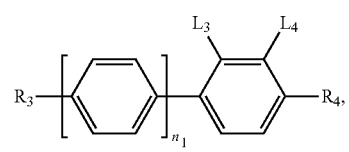

wherein, $R_1$ represents $C_{2-11}$ linear or $C_{3-11}$ branched alkenoxy;

$R_2$ represents $C_{1-12}$ linear or $C_{3-12}$ branched alkyl,

one or more than two nonadjacent —$CH_2$— in the $C_{1-12}$ linear or $C_{3-12}$ branched alkyl can each be independently replaced by —CH=CH—, —C≡C—, —O—, —CO—, —CO—O— or —O—CO—;

$R_3$ and $R_4$ each independently represents $C_{1-11}$ linear or $C_{3-11}$ branched alkoxy;

$L_1, L_2, L_3$ and $L_4$ each independently represents —F, —Cl, —$CF_3$, —$OCF_3$ or —$CHF_2$; and $n_1$ represents 0 or 1.

2. The liquid crystal composition according to claim 1, wherein the liquid crystal composition comprises at least two compounds of general formula II.

3. The liquid crystal composition according to claim 2, wherein the liquid crystal composition comprises at least one compound of general formula II in which $n_1$ represents 1.

4. The liquid crystal composition according to claim 1, wherein the liquid crystal composition further comprises at least one compound of general formula M:

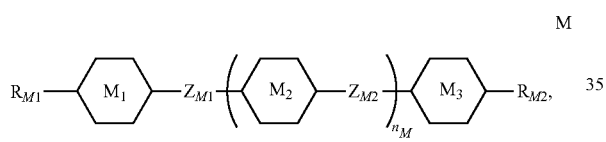

wherein, $R_{M1}$ and $R_{M2}$ each independently represents $C_{1-12}$ linear or $C_{3-12}$ branched alkyl,

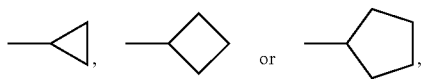

one or more than two nonadjacent —$CH_2$— in the $C_{1-12}$ linear or $C_{3-12}$ branched alkyl can each be independently replaced by —CH=CH—, —C≡C—, —O—, —CO—, —CO—O— or —O—CO—;

ring

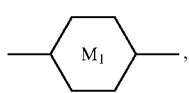

ring

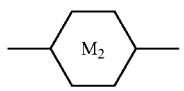

and ring

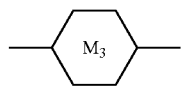

each independently represents

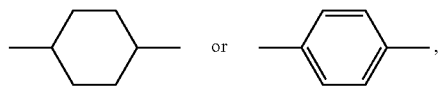

wherein one or more —$CH_2$— in

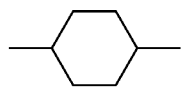

can be replaced by —O—, and one or more single bond in the ring can be replaced by double bond, and at most one —H on

can be substituted by halogen, $Z_{M1}$ and $Z_{M2}$ each independently represents single bond, —CO—O—, —O—CO—, —$CH_2$O—, —O$CH_2$—, —C≡C—, —CH=CH—, —$CH_2CH_2$— or —$(CH_2)_4$—; and $n_M$ represents 0, 1 or 2, wherein, when $n_M$=2, ring

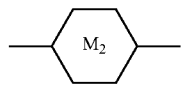

can be same or different, and $Z_{M2}$ can be same or different.

5. The liquid crystal composition according to claim 4, wherein the liquid crystal composition further comprises at least one compound of general formula III:

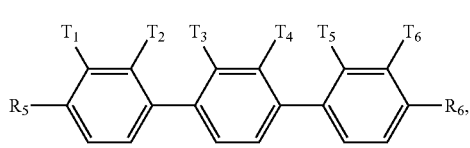

wherein, $R_5$ and $R_6$ each independently represents $C_{1-12}$ linear or branched alkyl,

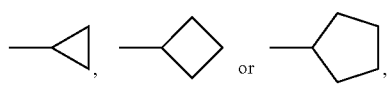

one or more than two nonadjacent —CH$_2$— in the C$_{1-12}$ linear or C$_{3-12}$ branched alkyl can each be independently replaced by —CH=CH—, —C≡C—, —O—, —CO—, —CO—O— or —O—CO—;

T$_1$, T$_2$, T$_3$, T$_4$, T$_5$ and T$_6$ each independently represents —H, C$_{1-3}$ alkyl or halogen; and the compound of general formula III comprises at least one ring structure

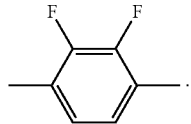.

6. The liquid crystal composition according to claim 5, wherein the compound of general formula I provides 0.1-50 wt. % of the total weight of the liquid crystal composition; the compound of general formula II provides 0.1-60 wt. % of the total weight of the liquid crystal composition; the compound of general formula M provides 1-80 wt. % of the total weight of the liquid crystal composition; and the compound of general formula III provides 0.1-30 wt. % of the total weight of the liquid crystal composition.

7. The liquid crystal composition according to claim 1, wherein the liquid crystal composition further comprises at least one compound of general formula N:

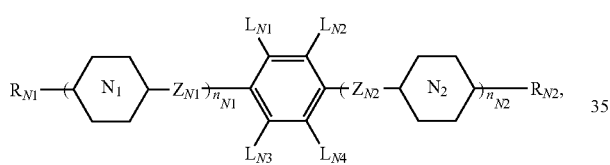

wherein,

R$_{N1}$ and R$_{N2}$ each independently represents C$_{1-12}$ linear or branched alkyl,

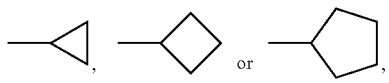

one or more than two nonadjacent —CH$_2$— in the C$_{1-12}$ linear or C$_{1-12}$ branched C$_{3-12}$ alkyl can each be independently replaced by —CH=CH—, —C≡C—, —O—, —CO—, —CO—O— or —O—CO—;

ring

and ring

each independently represents

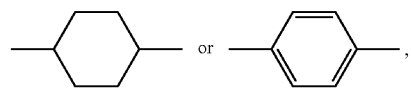

wherein one or more —CH$_2$— in

can be replaced by —O—, one or more single bond in the ring can be replaced by double bond, wherein one or more —H on

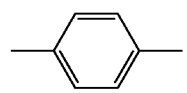

can each be independently substituted by —F, —Cl or —CN, and one or more —CH= within the ring can be replaced by —N=;

Z$_{N1}$ and Z$_{N2}$ each independently represents single bond, —CO—O—, —O—CO—, —CH$_2$O—, —OCH$_2$—, —CH=CH—, —C≡C—, —CH$_2$CH$_2$—, —CF$_2$CF$_2$—, —(CH$_2$)$_4$—, —CF$_2$O— or —OCF$_2$—;

L$_{N1}$ and L$_{N2}$ each independently represents —F, —Cl, —CF$_3$, —OCF$_3$ or —CHF$_2$;

L$_{N3}$ and L$_{N4}$ each independently represents —H, C$_{1-3}$ alkyl or halogen;

nN$_1$ represents 0, 1, 2 or 3, n$_{N2}$ represents 0 or 1, and 0≤n$_{N1}$+n$_{N2}$≤3, wherein when n$_{N1}$=2 or 3, ring

can be same or different and Z$_{N1}$ Can be same or different;

when n$_{N1}$+n$_{N2}$=0, or n$_{N1}$+n$_{N2}$=1, and the compound of general formula N comprises biphenyl structure, R$_{N1}$ and R$_{N2}$ are not alkoxy;

when n$_{N1}$ represents 2, n$_{N2}$ represents 0, and the compound of general formula N comprises biphenyl structure, R$_{N1}$ is not alkenyl or alkenoxy; and when n$_{N1}$+n$_{N2}$=3, the compound of general formula N does not comprise terphenyl structure.

8. A liquid crystal display device comprising the liquid crystal composition of claim 1.

9. The liquid crystal composition according to claim 4, wherein the compound of general formula M is selected from a group consisting of the following compounds:

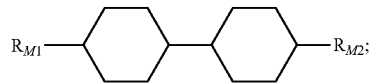

M-1

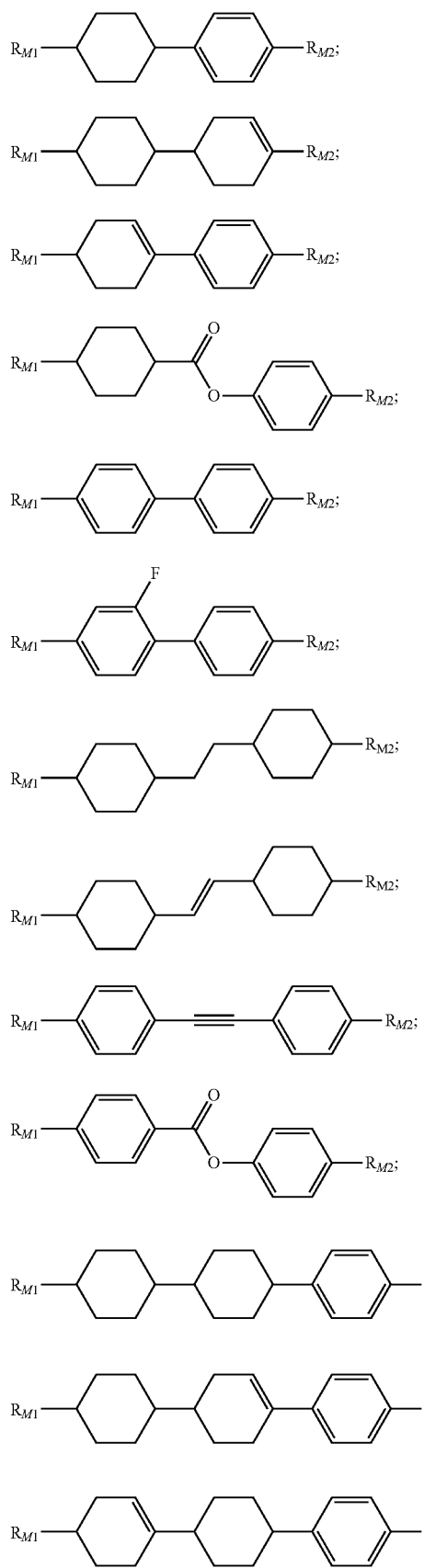
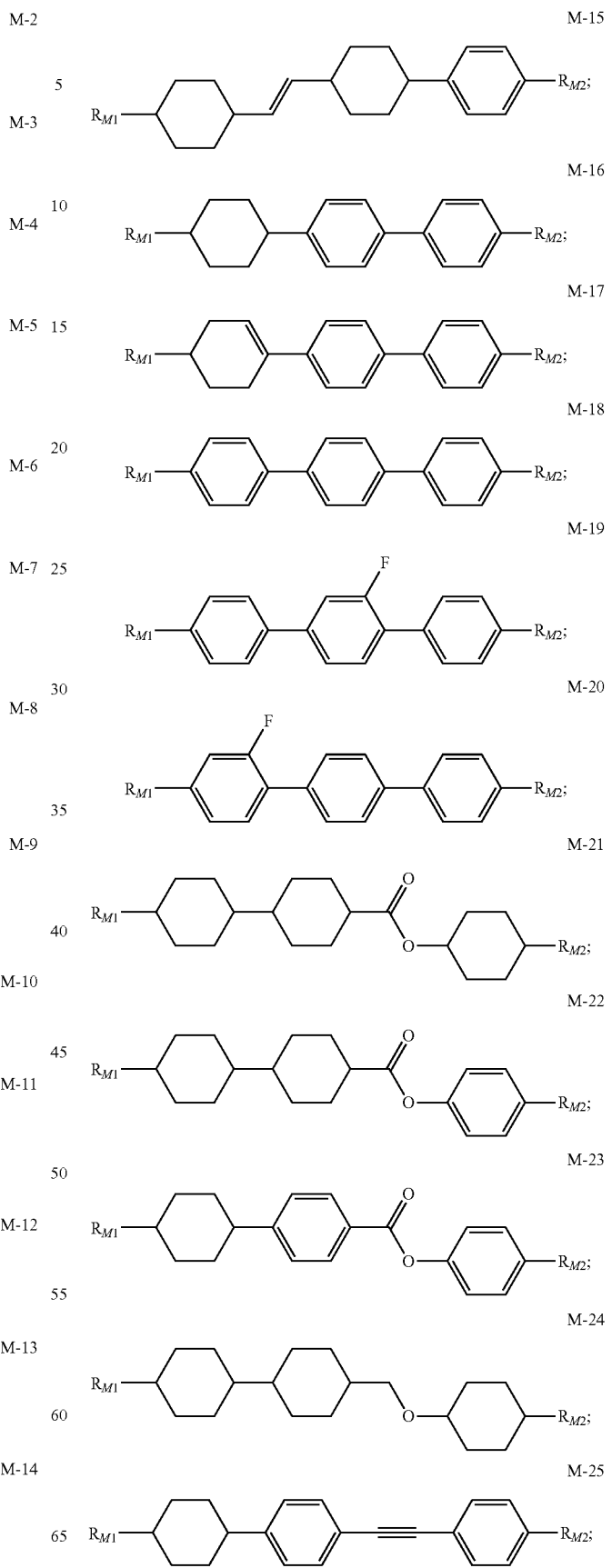

-continued

M-26
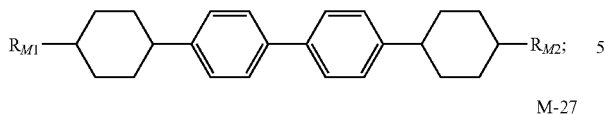

M-27
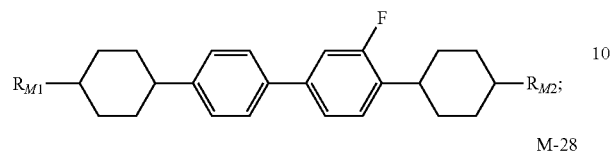

M-28
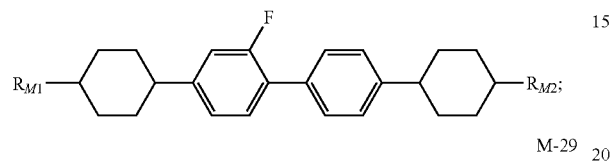

M-29
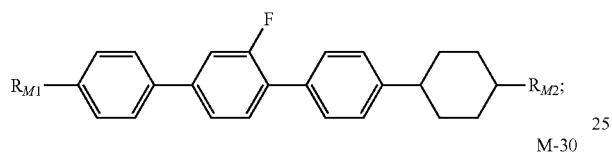

M-30
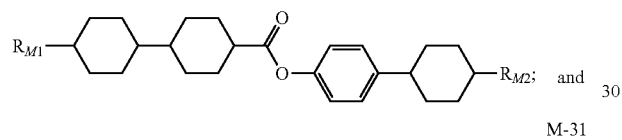

M-31
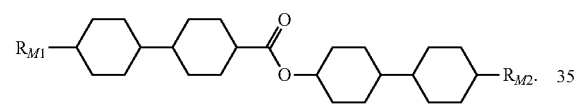

wherein, $R_{M1}$ and $R_{M2}$ each independently represents $C_{1-12}$ linear or $C_{3-12}$ branched alkyl,

one or more than two nonadjacent —CH$_2$— in the $C_{1-12}$ linear or $C_{3-12}$ branched alkyl can each be independently replaced by —CH=CH—, —C≡C—, —O—, —CO—C—O—O— or —O—CO—;

ring
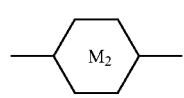, ring
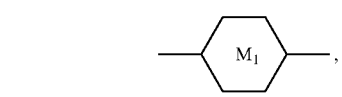

and ring

each independently represents

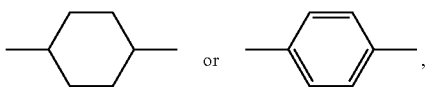

wherein one or more —CH$_2$— in

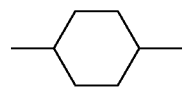

can be replaced by —O—, and one or more single bond in the ring can be replaced by double bond, and at most one —H on

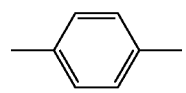

can be substituted by halogen.

10. The liquid crystal composition according to claim 5, wherein the compound of general formula III is selected from a group consisting of the following compounds:

III-1
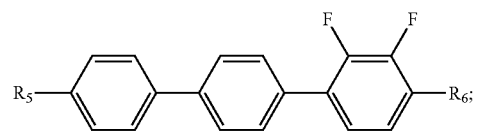

III-2
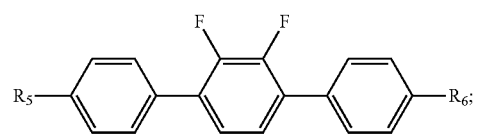

3
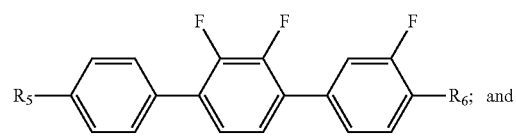 and

4
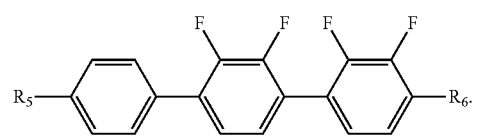

wherein $R_5$ and $R_6$ each independently represents $C_{1-12}$ linear or $C_{3-12}$ branched alkyl,

one or more than two nonadjacent —$CH_2$— in the $C_{1-12}$ linear or $C_{3-12}$ branched alkyl can each be independently replaced by —CH=CH—, —C≡C—, —O—, —CO—, —CO—O— or —O—CO—.

11. The liquid crystal composition according to claim 7, wherein the compound of general formula N is selected from a group consisting of the following compounds:

N-1
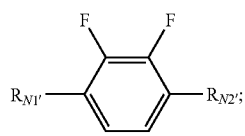

N-2
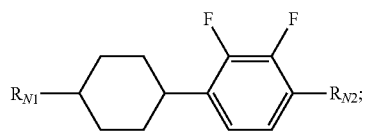

N-3
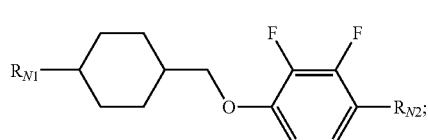

N-4
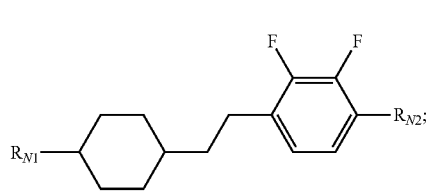

N-5
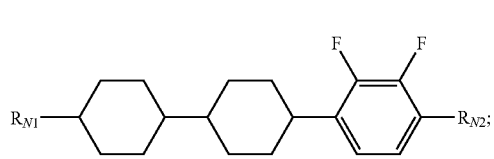

N-6
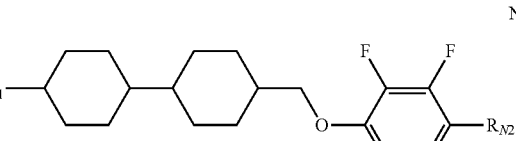

N-7
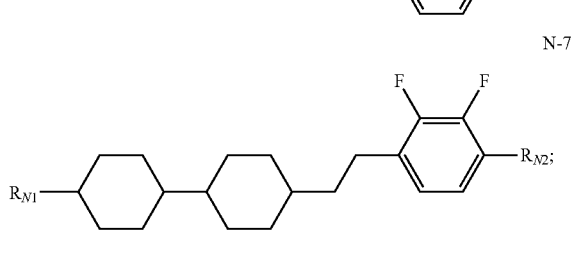

-continued

N-8
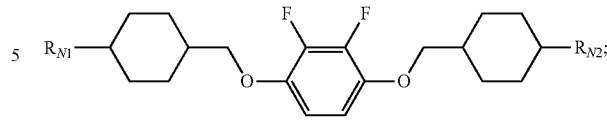

N-9
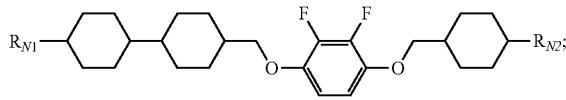

N-10
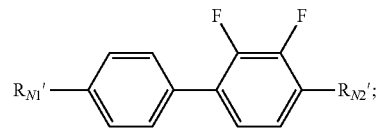

N-11
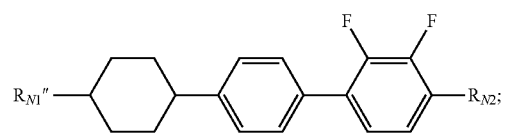

N-12
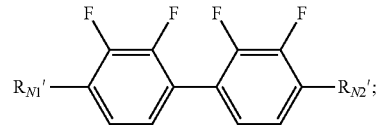

N-13
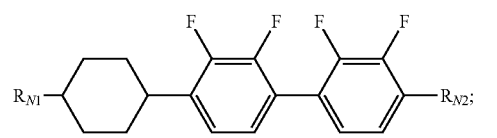

N-14
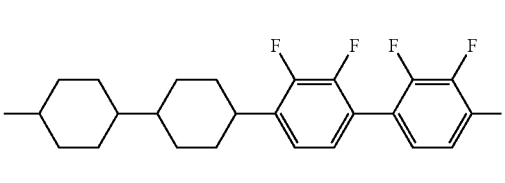

N-15
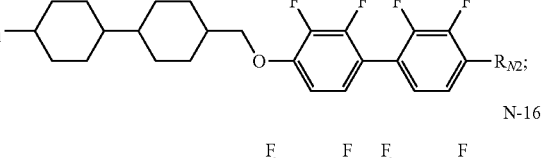

N-16
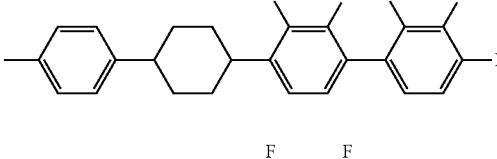

N-17

N-18
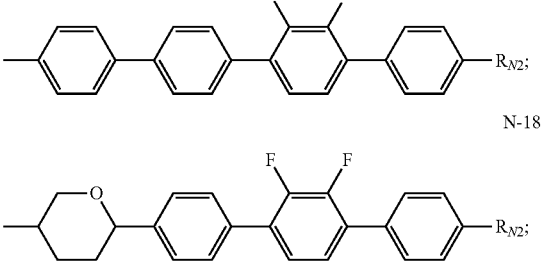

-continued

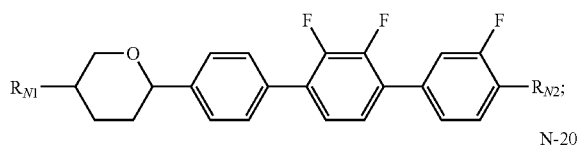
N-19

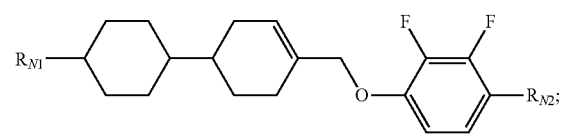
N-20

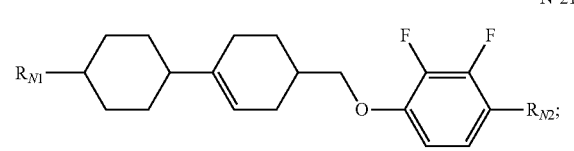
N-21

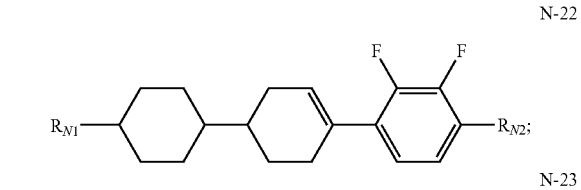
N-22

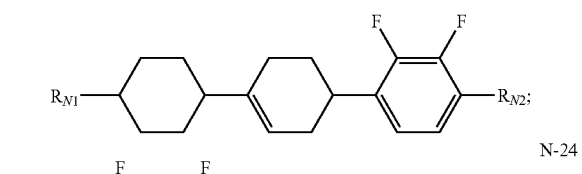
N-23

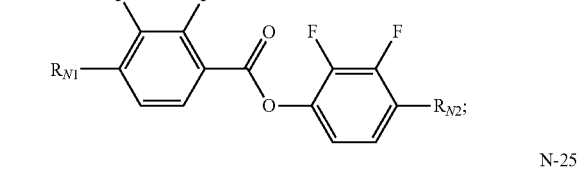
N-24

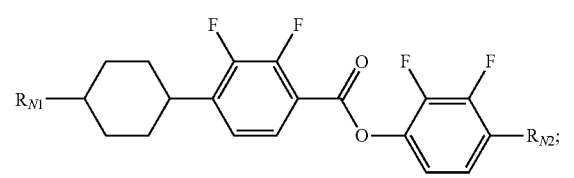
N-25

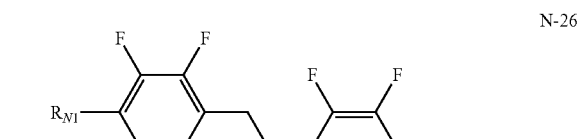
N-26

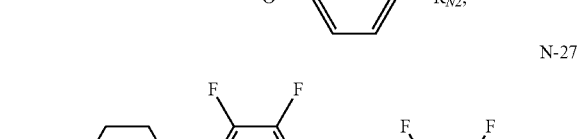
N-27

-continued

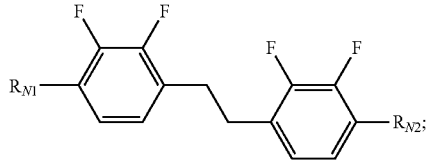
N-28

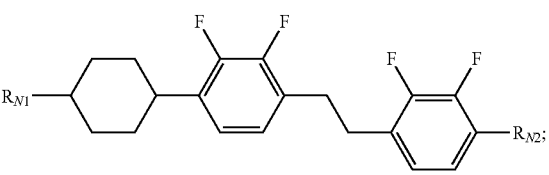
N-29

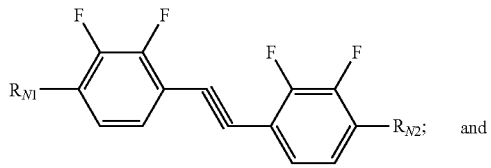
N-30 and

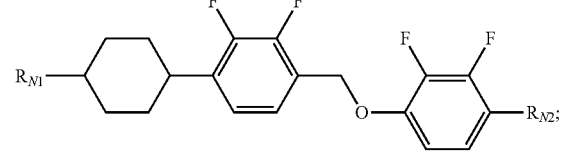
N-31 wherein, $R_{N1}$ and $R_{N2}$ each independently represents $C_{1-12}$ linear or $C_{3-12}$ branched alkyl,

one or more than two nonadjacent —CH$_2$— in the $C_{1-12}$ linear or $C_{3-12}$ branched $C_{3-12}$ alkyl can each be independently replaced by —CH=CH—, —C≡C—, —O—, —CO—, —CO—O— or —O—CO—;

$R_{N1}'$ and $R_{N2}'$ each independently represents $C_{1-8}$ linear or $C_{3-8}$ branched alkyl, or $C_{2-8}$ linear or $C_{3-8}$ branched alkenyl; and $R_{N1}''$ represents $C_{1-8}$ linear or $C_{3-8}$ branched alkyl, or $C_{1-7}$ linear or $C_{3-7}$ branched alkoxy.

12. The liquid crystal composition according to claim 11, wherein the compound of general formula N provides 0.1-60 wt. %.

* * * * *